US011030092B2

(12) United States Patent
Xu et al.

(10) Patent No.: US 11,030,092 B2
(45) Date of Patent: *Jun. 8, 2021

(54) ACCESS REQUEST PROCESSING METHOD AND APPARATUS, AND COMPUTER SYSTEM

(71) Applicant: Huawei Technologies Co., Ltd., Shenzhen (CN)

(72) Inventors: Jun Xu, Nanjing (CN); Qun Yu, Beijing (CN); Licheng Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,372

(22) Filed: Jan. 21, 2020

(65) Prior Publication Data

US 2020/0159655 A1 May 21, 2020

Related U.S. Application Data

(63) Continuation of application No. 16/018,602, filed on Jun. 26, 2018, now Pat. No. 10,606,746, which is a (Continued)

(51) Int. Cl.
*G06F 12/02* (2006.01)
*G06F 3/06* (2006.01)
(Continued)

(52) U.S. Cl.
CPC ........ *G06F 12/0246* (2013.01); *G06F 3/0619* (2013.01); *G06F 3/0656* (2013.01);
(Continued)

(58) Field of Classification Search
CPC .... G06F 3/0656; G06F 3/0619; G06F 3/0679; G06F 12/0246; G06F 12/0804;
(Continued)

(56) References Cited

U.S. PATENT DOCUMENTS

| 5,893,140 A | 4/1999 | Vahalia et al. |
| 2006/0184719 A1 | 8/2006 | Sinclair |

(Continued)

FOREIGN PATENT DOCUMENTS

| CN | 101903866 A | 12/2010 |
| CN | 103838676 A | 6/2014 |

(Continued)

OTHER PUBLICATIONS

Machine Translation and Abstract of Chinese Publication No. CN103955528, Jul. 30, 2014, 24 pages.

(Continued)

*Primary Examiner* — Kalpit Parikh
(74) *Attorney, Agent, or Firm* — Conley Rose, P.C.

(57) ABSTRACT

An access request processing apparatus comprises, a processor determines an object cache page according to a write request when receiving the write request. After determining that the NVM stores a log chain of the object cache page, the processor inserts, into the log chain of the object cache page, a second data node recording information about a second log data chunk. The log chain already includes a first data node recording information about the first log data chunk. The second log data chunk is at least partial to-be-written data of the write request. Then, the processor sets, in the first data node, data that is in the first log data chunk and that overlaps the second log data chunk to invalid data.

20 Claims, 8 Drawing Sheets

Related U.S. Application Data continuation of application No. PCT/CN2015/099930, filed on Dec. 30, 2015.

(51) Int. Cl.
  *G06F 12/0804* (2016.01)
  *G06F 12/0868* (2016.01)
  *G06F 12/0866* (2016.01)

(52) U.S. Cl.
  CPC ........ *G06F 3/0679* (2013.01); *G06F 12/0804* (2013.01); *G06F 12/0866* (2013.01); *G06F 12/0868* (2013.01); *G06F 2212/1016* (2013.01); *G06F 2212/1041* (2013.01); *G06F 2212/313* (2013.01); *G06F 2212/461* (2013.01); *G06F 2212/502* (2013.01); *G06F 2212/7203* (2013.01)

(58) Field of Classification Search
  CPC ............. G06F 12/0868; G06F 12/0866; G06F 2212/7203; G06F 2212/1016; G06F 2212/313; G06F 2212/502; G06F 2212/461; G06F 2212/1041
  See application file for complete search history.

(56) References Cited

U.S. PATENT DOCUMENTS

| | | |
|---|---|---|
| 2009/0049234 A1 | 2/2009 | Oh et al. |
| 2009/0150599 A1 | 6/2009 | Bennett |
| 2011/0185107 A1 | 7/2011 | Yano et al. |
| 2012/0239869 A1 | 9/2012 | Chiueh et al. |
| 2012/0254120 A1 | 10/2012 | Fang et al. |
| 2013/0138873 A1 | 5/2013 | Gorobets et al. |
| 2013/0166855 A1 | 6/2013 | Batwara et al. |
| 2015/0052295 A1 | 2/2015 | Danilak et al. |
| 2015/0261673 A1 | 9/2015 | Wei et al. |
| 2018/0300236 A1 | 10/2018 | Xu et al. |

FOREIGN PATENT DOCUMENTS

| | | |
|---|---|---|
| CN | 103955528 A | 7/2014 |
| CN | 105159818 A | 12/2015 |
| EP | 2309392 A1 | 4/2011 |
| WO | 2011090500 A1 | 7/2011 |

OTHER PUBLICATIONS

Foreign Communication From a Counterpart Application, European Application No. 15911840.5, Extended European Search Report dated Dec. 6, 2018, 10 pages.

Foreign Communication From a Counterpart Application, European Application No. 15911842.1, Extended European Search Report dated Nov. 28, 2018, 7 pages.

Foreign Communication From a Counterpart Application, PCT Application No. PCT/CN2015/099930, English Translation of International Search Report dated Sep. 20, 2016, 2 pages.

Foreign Communication From a Counterpart Application, PCT Application No. PCT/CN2015/099930, English Translation of Written Opinion dated Sep. 20, 2016, 4 pages.

Hua, X., et al., "Principles of computer operating system: Linux example analysis," 2008. with english abstract, 5 pages.

Machine Translation and Abstract of Chinese Publication No. CN103838676, Jan. 4, 2014, 22 pages.

Foreign Communication From a Counterpart Application, Chinese Application No. 201580085465.4, Chinese Office Action dated Feb. 3, 2020, 6 pages.

Foreign Communication From a Counterpart Application, Chinese Application No. 201580085465.4, Chinese Search Report dated Jan. 19, 2020, 2 pages.

Machine Translation and Abstract of Chinese Publication No. CN105159818, Dec. 16, 2015, 19 pages.

Foreign Communication From a Counterpart Application, Chinese Application No. 2015800854442, Chinese Search Report dated Dec. 12, 2019, 2 pages.

Foreign Communication From a Counterpart Application, Chinese Application No. 2015800854442, Chinese Office Action dated Dec. 31, 2019, 22 pages.

ACCESS REQUEST PROCESSING METHOD AND APPARATUS, AND COMPUTER SYSTEM

CROSS-REFERENCE TO RELATED APPLICATIONS

This application a continuation of U.S. patent application Ser. No. 16/018,602, filed on Jun. 26, 2018, which is a continuation of International Application No. PCT/CN2015/099930, filed on Dec. 30, 2015. All of the aforementioned patent applications are hereby incorporated by reference in their entireties.

TECHNICAL FIELD

The present disclosure relates to the field of storage technologies, and in particular, to an access request processing method and apparatus, and a computer system.

BACKGROUND

In a storage system, data consistency is retained in a write-ahead logging (WAL) manner. According to this manner, all data to be written to the storage system is first written to a log file of an external storage device (for example, a magnetic disk), and previous data is subsequently updated according to the log file. When a fault such as a power failure or a breakdown occurs in the system, data can be restored according to a log, thereby ensuring data consistency. With development of a next-generation non-volatile memory (NVM) technology, the next-generation NVM has relatively high reading and writing speeds and is byte addressable, and therefore can be used as a system memory. Such a storage class memory (SCM) using the NVM as a medium features non-volatility, and provides a new method for data consistency protection in the storage system.

In a method for implementing data consistency based on an SCM, a cache and a log share storage space of the SCM. In this implementation, an SCM block may be used as both a cache block and a log block. In the SCM, a block is used as a basic unit of the storage space. Generally, a size of a block may be 4 kilobytes (KB). Each block has three state pairs, frozen/normal, dirty/clean, and up-to-date/out-of-date. "frozen" is used to indicate that the block is a log block, that is, data in the block may be used as a log. "normal" is used to indicate that the block is a cache block, that is, the block is used as a cache. "dirty" is used to indicate that data stored in the block has been modified. "clean" is used to indicate that data stored in the block has not been modified. "up-to-date" is used to indicate that data stored in the block is a latest version. "out-of-date" is used to indicate that data stored in the block is an earlier version. In a data update process, first, a block is allocated to data in the memory, and a state of the block is recorded as (normal, clean, up-to-date). After the data is written to the block, the state of the block is updated to (normal, dirty, up-to-date). The block in the (normal, dirty, up-to-date) state can be directly read or written, that is, data can be directly read from the block in the (normal, dirty, up-to-date) state or data can be directly written to the block in the (normal, dirty, up-to-date) state. After the current write operation is completed, during transaction submission, the memory block is used as a log block, and the state of the memory block is modified to (frozen, dirty, up-to-date). When new data is subsequently written to the memory block, the state of the memory block is modified to (frozen, dirty, out-of-date). The memory block in the (frozen, dirty, out-of-date) state may be written back to a magnetic disk. After the memory block is written back to the magnetic disk, the memory block becomes a free block and can be used for a new write operation. Compared with the WAL manner, the method of using the SCM as both cache space and log space reduces data write operations. However, states of blocks need to be maintained, leading to relatively high system overheads. In addition, in this manner, data needs to be updated at a granularity of a block, and when data to be updated is smaller than a block, a write amplification problem is caused. Consequently, data actually written to the magnetic disk is more than data needing to be written to the magnetic disk.

SUMMARY

Embodiments of the present disclosure provide an access request processing method and apparatus, and a computer system, to reduce system overheads while protecting data consistency.

According to a first aspect, this application provides an access request processing method. The method may be performed by a computer system. The computer system includes a processor and a NVM. In the computer system, when receiving a write request carrying a file identifier, a buffer pointer, and a size of to-be-written data, the processor may obtain an access location according to the file identifier carried in the write request. The buffer pointer points to a buffer for caching the to-be-written data, the to-be-written data is modified data of an object file that is to be accessed according to the write request, and the access location indicates a start address for writing data into the object file according to the write request. Further, the processor may determine object cache pages according to the access location, the size of the to-be-written data, and a size of a cache page. The object cache pages are memory pages in internal memory that are configured to cache file data that is in the object file and that is modified by the to-be-written data. After determining that the NVM stores a log chain (log chain) of a first object cache page of the object cache pages, the processor inserts a second data node into the log chain of the first object cache page. The log chain of the first object cache page includes a first data node, the first data node includes information about a first log data chunk, and the first log data chunk includes modified data of the first object cache page during one modification. Second log data chunk is at least partial to-be-written data that is obtained from the buffer to which the buffer pointer points. Information about the second log data chunk includes the second log data chunk or a storage address of the second log data chunk in the NVM. Further, after determining that an intra-page location of the second log data chunk overlaps an intra-page location of the first log data chunk, the processor sets, in the first data node, data that is in the first log data chunk and that overlaps the second log data chunk to invalid data.

According to the access request processing method provided in this application, when the processor needs to modify data of a file according to the write request received by the processor, the processor does not directly write the modified data into an object cache page of the file, but instead, the processor writes the modified data into storage space of the NVM, and records, in a log chain form, information about each data modification to the object cache page. Because the NVM is non-volatile, and written data is stored in the NVM in a recording manner using the log chain, the modified data of the object cache page in multiple modification processes can be recorded in a chronological order, thereby facilitating identification of a version relationship between log data chunks, and ensuring consistency between stored data and the written data. Because state maintenance brings higher system overheads than a write update process, when being used, the access request processing method provided in this application can reduce system overheads of the computer system in an access request processing process. In addition, in the access request processing method provided in this application, a size of a log data chunk can be less than that of a page, and therefore, the access request processing method provided in this application can support file modification at a granularity smaller than a page, implementing a more flexible modification manner.

Further, in the access request processing method provided in this application, data that is in a log data chunk of an existing data node in a log chain of the object cache page and that overlaps current modified data is set to invalid data, so that a log data chunk recorded in the log chain of the object cache page is latest modified data of the cache page. Therefore, in a reading data process, the log data chunk may be directly updated to the object cache page according to information about the log data chunk recorded in the log chain of the object cache page, thereby improving a data reading speed.

Further, in the access request processing method provided in this application, after writing the to-be-written data into the NVM according to the write request, the processor may respond to an application with a write success message. The write success message indicates that the to-be-written data is successfully written to a storage device. In this way, an access request processing delay can be reduced.

In a possible implementation, in a process of determining that the NVM stores the log chain of the first object cache page, the processor may determine, according to at least one of the following fields in a cache page structure of the first object cache page, that the NVM stores the log chain of the first object cache page, "log head", "log tail", "logs", or "log dirty". The "log head" field is configured to point to the first address of the log chain of the first object cache page, the "log tail" field is configured to point to the first address of the last data node in the log chain of the first object cache page, the "logs" field is configured to indicate a quantity of data nodes in the log chain of the first object cache page, and the "log dirty" field is configured to indicate whether the first object cache page is synchronized with a log data chunk indicated by a data node in the log chain of the object cache page.

In another possible implementation, when determining that the NVM does not store the log chain of the first object cache page, the processor may create a log chain in the NVM for the first object cache page. In this way, a data node can be inserted into the newly created log chain, and information about a log data chunk of the first object cache page can be recorded in the inserted data node.

In another possible implementation, in the process of performing the operation of inserting a new data node into the log chain of the first object cache page, the processor may insert the second data node into a tail or a head of the log chain of the first object cache page. After the second data node is inserted, the log chain of the first object cache page includes at least two data nodes that are sequentially linked according to an update sequence of the first object cache page. In the manner of inserting the second data node according to such a sequence, log data chunks in different data nodes in the log chain of the first object cache page can be linked according to an early-to-late sequence of update versions of the first object cache page. In this way, different update versions of the first object cache page can be identified according to an order of the data nodes in the log chain of the first object cache page. In a data reading process, correctness of read data can be ensured.

In another possible implementation, the processor may further update at least one log data chunk in the log chain to the first object cache page according to information about the at least one log data chunk, to obtain an updated first object cache page, and store data of the updated first object cache page in an external storage device of the computer system, where the information about the at least one log data chunk is recorded in the log chain of the first object cache page. According to this manner, file data in a magnetic disk can be updated, thereby retaining data consistency. In addition, in the access request processing method provided in this application, after the data is written to the NVM, the modified data in the NVM does not need to be immediately written to an external storage of the computer system. Instead, when the storage space of the NVM needs to be reclaimed or data of the computer system is restored, a log data chunk stored in the NVM is updated to a corresponding cache page, and file data in the magnetic disk is updated according to an updated cache page. Compared with an existing write-ahead logging WAL manner and copy on write manner for retaining data consistency, in this manner, the modified data is merged into the object cache page, and then the object cache page obtained after merging is written to the magnetic disk, so that write amplification of the system can be reduced.

In another possible implementation, when the intra-page location of the second log data chunk partially overlaps the intra-page location of the first log data chunk, the processor modifies, in the first data node, information about the intra-page location of the first log data chunk according to an intra-page location of the data that is in the first log data chunk and that overlaps the second log data chunk, to set the data that is in the first log data chunk and that overlaps the second log data chunk to invalid data. The information about the intra-page location of the first log data chunk includes at least one of an "intra-page offset" or a "log data length" of the first log data chunk.

In another possible implementation, when the intra-page location of the second log data chunk includes the intra-page location of the first log data chunk, the processor deletes the first data node, to set the data that is in the first log data chunk and that overlaps the second log data chunk to invalid data.

In another possible implementation, when the intra-page location of the first log data chunk includes the intra-page location of the second log data chunk, the processor splits the first data node into a first data subnode and a second data subnode, and separately records, in the first data subnode and the second data subnode, data that is in the first log data chunk and that does not overlap the second log data chunk, to set the data that is in the first log data chunk and that overlaps the second log data chunk to invalid data. Data structures of the first data subnode and the second data subnode are the same as a data structure of the first data node.

In another possible implementation, after storing the data of the updated first object cache page in the external storage device of the computer system, the processor may further reclaim the log chain of the first object cache page. In this way, storage space of the NVM can be reclaimed, thereby saving system resources.

In another possible implementation, the information about the second log data chunk further includes information about the intra-page location of the second log data chunk and address information of an adjacent data node of the second data node. The intra-page location of the second log data chunk is a location of the second log data chunk in the first object cache page. The information about the intra-page location of the second log data chunk may include information such as an intra-page offset and a log data length. The intra-page offset is configured to indicate a start location of the second log data chunk in the first object cache page, and the log data length is configured to indicate a length of the second log data chunk. Address information of an adjacent data node of the first data node may be obtained according to information about a "previous log address" and information about a "next log address" in the second data node. The "previous log address" is configured to indicate a start address of a previous data node in the NVM, and the "next log address" is configured to indicate a start address of a next data node in the NVM. Latest modified data of the first object cache page can be determined according to the information about the second log data chunk. In this way, an order of data nodes can be obtained according to the log chain of the first object cache page, so that different update versions of the first object cache page can be determined according to information recorded in the data nodes in the log chain of the first object cache page.

According to a second aspect, this application provides a computer system. The computer system includes a non-volatile memory NVM and a processor that is connected to the NVM. The processor is configured to perform the method according to the first method and the possible implementations of the first aspect.

According to a third aspect, this application provides an access request processing apparatus. The access request processing apparatus is applied to a computer system. The computer system includes a NVM. The access request processing apparatus includes modules configured to perform the method according to the first aspect and the possible implementations of the first aspect.

According to a fourth aspect, this application provides a computer program product, including a computer readable storage medium storing program code. An instruction included in the program code is configured to perform the method according to the first aspect.

BRIEF DESCRIPTION OF THE DRAWINGS

To describe the technical solutions in the embodiments of the present disclosure more clearly, the following briefly describes the accompanying drawings required for describing the embodiments. The accompanying drawings in the following description show merely some embodiments of the present disclosure.

DETAILED DESCRIPTION

To make a person skilled in the art understand the technical solutions in the present disclosure better, the following describes the technical solutions in the embodiments of the present disclosure with reference to the accompanying drawings in the embodiments of the present disclosure. The described embodiments are merely some but not all of the embodiments of the present disclosure.

Figure 1:
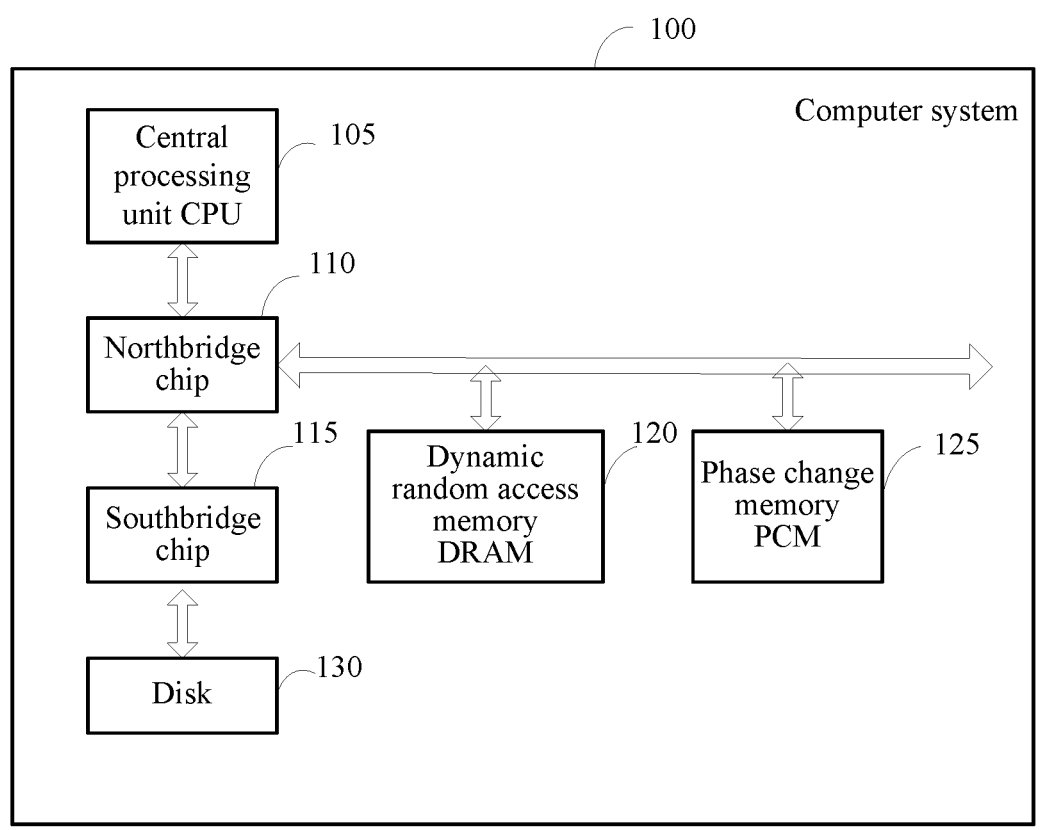
FIG. 1 is a schematic diagram of an architecture of a computer system according to an embodiment of the present disclosure.

FIG. 1 is a schematic diagram of an architecture of a computer system according to an embodiment of the present disclosure. The architecture of the computer system shown in FIG. 1 is a hybrid-memory computer system architecture. In the architecture of the computer system shown in FIG. 1, a dynamic random access memory (DRAM) and a phase change memory (PCM) are used as internal memory. As shown in FIG. 1, the computer system 100 may include a central processing unit (CPU) 105, a northbridge chip 110, a southbridge chip 115, the dynamic random access memory DRAM 120, the phase change memory the PCM 125, and a disk 130.

The CPU 105 is a core of the computer system 100. The CPU 105 may invoke different software programs in the computer system 100 to implement different functions. For example, the CPU 105 can implement access to the DRAM 120, the PCM 125, and the disk 130. It may be understood that in this embodiment of the present disclosure, the (CPU 105 is merely an example of a processor. In addition to the CPU 105, the processor may be another application-specific integrated circuit (ASIC), or may be one or more integrated circuits configured to implement this embodiment of the present disclosure.

The northbridge chip 110 is usually configured to process a high-speed signal in the computer system 100. In an embodiment, the northbridge chip 110 may be configured to process communication between the CPU, internal memory, and the southbridge chip. The northbridge chip 110 is connected to the CPU 105 by using a front side bus. The northbridge chip 110 is connected to the DRAM 120 and the PCM 125 by using a memory bus. In this manner, both the DRAM 120 and the PCM 125 are connected to the memory bus, and communicate with the CPU 105 by using the northbridge chip 110. A person skilled in the art may understand that the northbridge chip 110 and the CPU 105 may be integrated together.

The southbridge chip 115 is configured to be responsible for communication between the CPU 105 and an external device. The CPU 105 may communicate with the southbridge chip 115 by using a communications bus such as a peripheral component interconnect express (PCI-E) bus or a direct media interface (DMI) bus, to implement control of the CPU 105 on devices such as a peripheral component interconnect (PCI) interface device, a Universal Serial Bus (USB) interface device, and a Serial ATA (Serial Advanced Technology Attachment, SATA) interface device. For example, the southbridge chip 115 may be connected to the disk 130 by using the SATA interface, so that the CPU 105 may communicate with the disk 130 by using the southbridge chip 115, to implement control on the disk 130. In this embodiment of the present disclosure, the southbridge chip includes, but is not limited to an integrated southbridge, for example, a Platform Controller Hub (PCH).

The dynamic random access memory (DRAM) 120 is connected to the northbridge chip 110 by using the memory bus. The DRAM 120 may communicate with the CPU 105 by using the northbridge chip 110. The CPU 105 can access the DRAM 120 at a high speed, and perform a read or write operation on any storage unit in the DRAM 120. The DRAM 120 has an advantage of a fast access speed. Therefore, the DRAM 120 is used as main memory. Usually, the DRAM 120 is configured to store various software that is running on the operating system, and input and output data, information exchanged with external storage, and the like. However, the DRAM 120 is volatile. After a computer is powered off, information in the DRAM 120 is lost. A person skilled in the art knows that the DRAM is one of volatile memories. In actual application, another random access memory (RAM) may be used as internal memory of the computer system. For example, a static random access memory (SRAM) may be used as internal memory of the computer system.

The PCM 125 is a new-type NVM. In this embodiment of the present disclosure, the PCM 125 and the DRAM 120 are jointly used as the internal memory of the computer system 100. The new-type NVM can perform byte addressing, and write data into the non-volatile memory by using a byte as a unit, and therefore can be used as internal memory. Compared with the DRAM 120, the PCM 125 has a characteristic of non-volatility, and therefore can better store data. In this embodiment of the present disclosure, a non-volatile memory that can be used as internal memory may be referred to as a SCM. It should be noted that in this embodiment of the present disclosure, the PCM 125 shown in FIG. 1 is merely an example of the SCM. In addition to the PCM, the SCM may further include another new-type non-volatile memory such as a resistive random access memory (RRAM), a magnetic random access memory (MRAM), or a ferroelectric random access memory (FRAM). A specific type of the SCM in this embodiment of the present disclosure is not limited herein.

The disk 130 may be connected to the southbridge chip 115 by using an interface such as a SATA interface or a small computer system interface (SCSI). The disk 130 is configured to store data, and is used as an external storage device of the computer system 100. Usually, a storage medium used as the external storage device needs to have a characteristic of non-volatility. After a computer is powered off, data stored in external storage is not lost. Moreover, the external storage has a relatively large storage capacity. It may be understood that the disk 130 is merely an example of the external storage device. In addition to the disk 130, a memory used as the external storage device may be another non-volatile storage device that can store data, such as a solid state drive (SSD), a hard disk drive (HDD), a compact disc, or a storage array.

It may be understood that the computer system shown in FIG. 1 is merely an example of the computer system. In actual application, with development of computer technologies, in a new generation of computer system, the CPU 105 may be connected to internal memory not by using the northbridge chip, and the DRAM 120 and the PCM 125 may communicate with the CPU 105 by using a double data rate (DDR) bus. In addition, the CPU 105 may be connected to the disk 130 not by using the southbridge chip. For example, the CPU 105 may be connected to the disk 130 by using a host bus adapter (HBA). In this embodiment of the present disclosure, a specific connection manner of internal components of the computer system is not limited, provided that the computer system includes a NVM. That is, the computer system in this embodiment of the present disclosure is a computer system including a persistent memory (PM).

Figure 2:
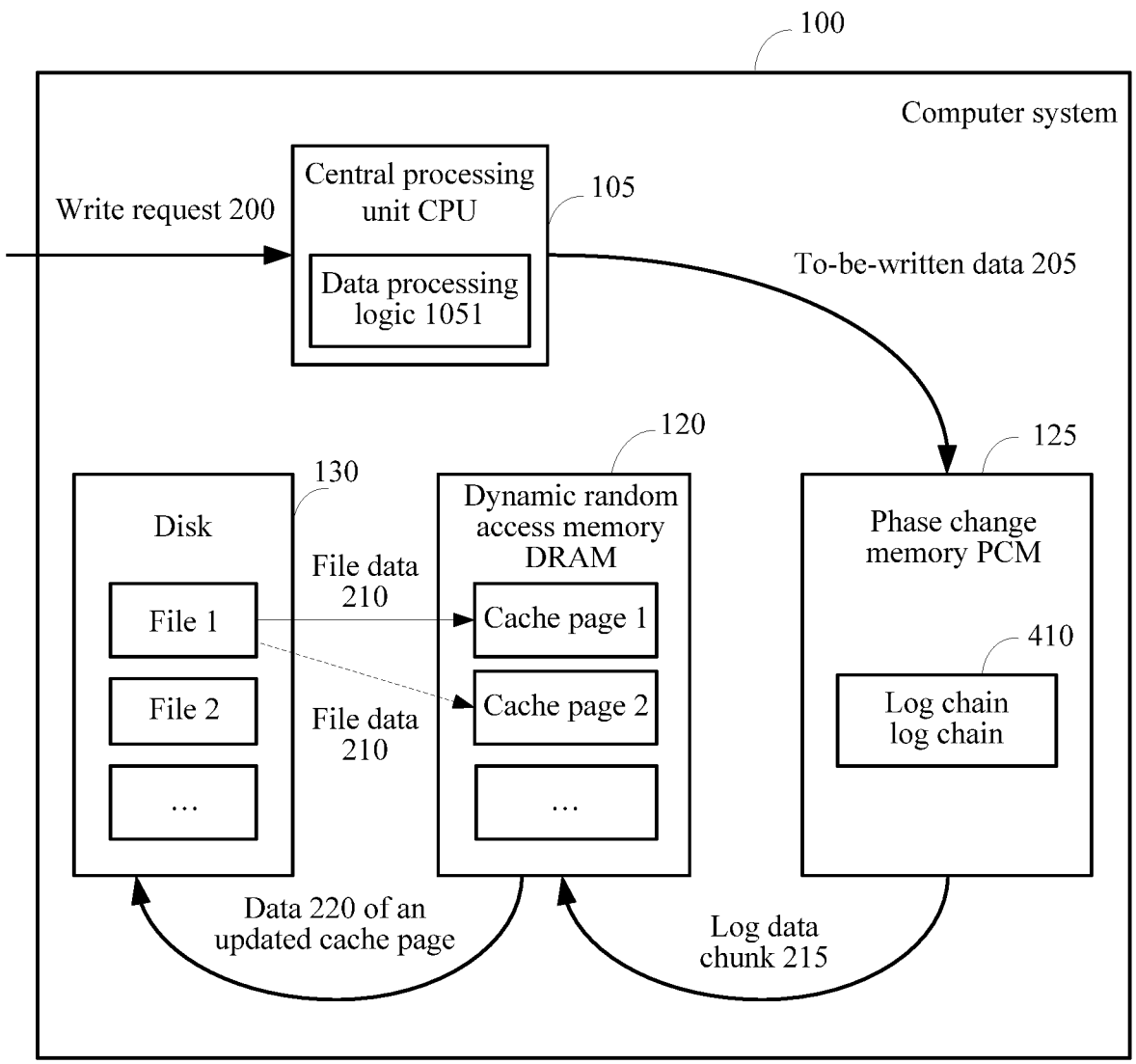
FIG. 2 is a schematic signaling diagram of a computer system according to an embodiment of the present disclosure.
Figure 3:
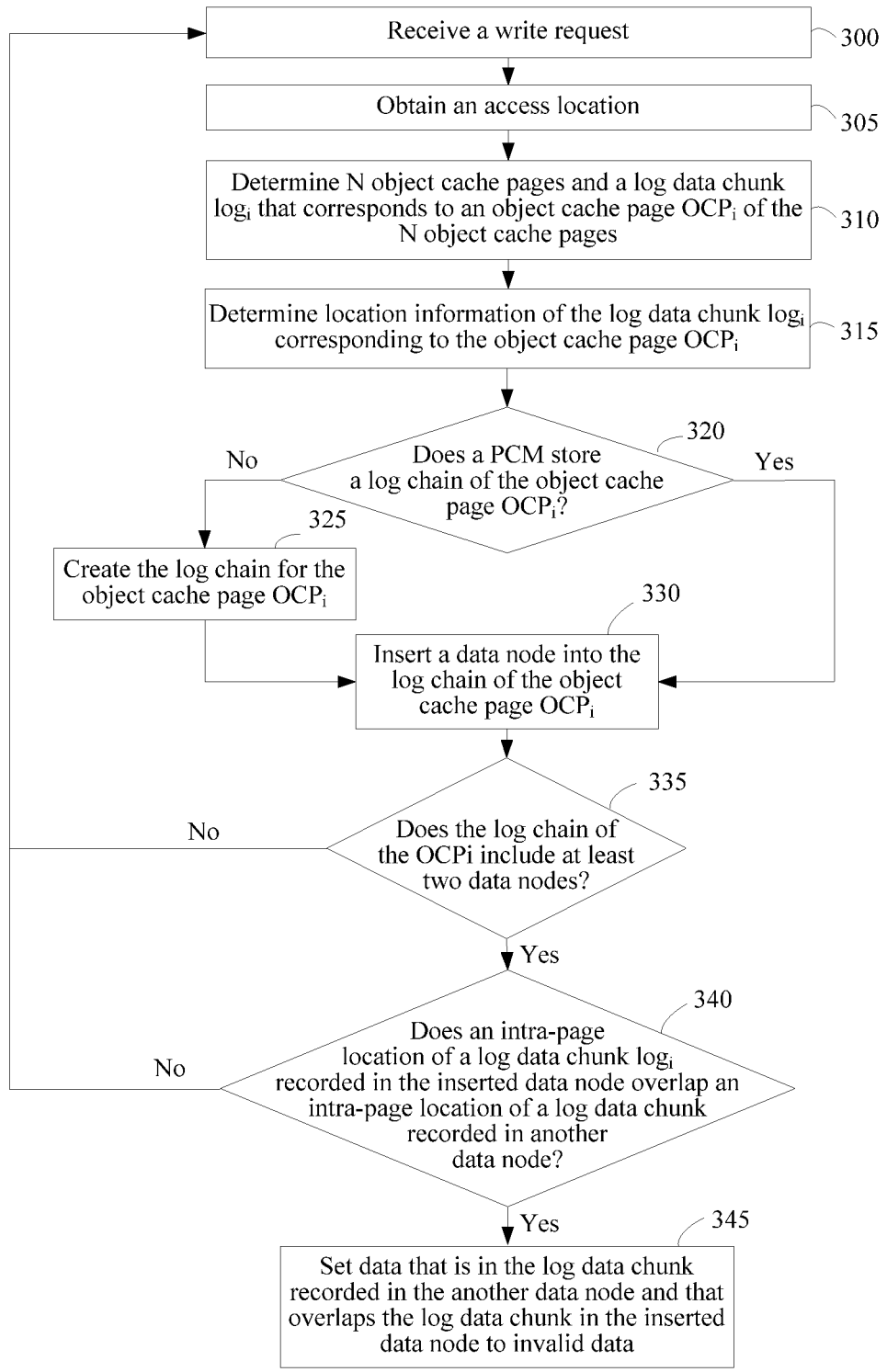
FIG. 3 is a flowchart of an access request processing method according to an embodiment of the present disclosure.

In the computer system shown in FIG. 1, to protect data consistency and ensure that written data is not lost even when a power failure, shutdown, or a software fault occurs in the computer system 100, in this embodiment of the present disclosure, a log chain established in the PCM 125 may be used to retain data consistency. With reference to FIG. 2 and FIG. 3, the following describes in detail how the computer system 100 shown in FIG. 1 reduces system overheads while keeping data consistency. FIG. 2 is a schematic signaling diagram of a computer system 100 according to an embodiment of the present disclosure. FIG. 3 shows an access request processing method according to an embodiment of the present disclosure. For ease of description, FIG. 2 shows only components used in a process in which the computer system 100 shown in FIG. 1 processes an access request. FIG. 3 illustrates an example in which the computer system 100 processes a write request. It should be noted that a process in which the CPU 105 processes an access request is implemented by invoking data processing logic (not shown in FIG. 2) of the CPU 105. It may be understood that the data processing logic may be a program for implementing the access request processing method in this embodiment of the present disclosure. In a running process of the computer system, the data processing logic may be stored in the DRAM 120.

A person skilled in the art may know that a file system is a software structure in an operating system and responsible for managing and storing file information. From the perspective of a system, the file system is a system that organizes and allocates space of a file storage device and that is responsible for file storage, and protects and retrieves a stored file. The file system includes three parts, an interface of the file system, a software set for file manipulation and management, and file data and attributes. When a process reads a file or writes a file, the operating system first opens, according to a file name, an object file that is to be accessed by the process, and then performs a read operation or a write operation on the opened object file according to a received read request or write request. The file name may be a full path name of the file and a logical description of location information of the object file in a disk. For example, a file name of the object file may be D:\FILE\file1. In a process of opening the file by using the full path name of the file, searching needs to be performed layer by layer according to the full path of the file, the disk is constantly read, and a corresponding data structure is created in the internal memory to indicate a directory structure of the object file. After the file is opened, in a process of accessing the object file according to the read request or the write request, if the read operation or the write operation is performed on the file still according to the full path name of the object file, the disk is frequently read or written. The process is relatively complex, and a processing time is relatively long. Therefore, in actual application, in the process in which the operating system opens the object file, the operating system allocates a file handle to the object file accessed by the process, and maintains a file handle array inside the process. The file handle may be represented by using a number. For example, the file handle may be fd 0, fd 1, or fd 2. The file handle array stores a pointer pointing to file description information. The file description information includes a pointer pointing to information such as a file directory structure, metadata, and an access location. The file directory structure is used to describe a logical location of a file. The file directory structure is stored in the internal memory. The process can find a location of the object file by using the file directory structure. The metadata is data used to describe file data. In an embodiment, the metadata includes information about organization of the file data, a data field, and a relationship thereof. The access location is used to indicate a start location currently accessed by the process. The access location may be a logical location. Usually, information about the access location may be 0, which is used to indicate that access starts from a start address of the file. In the process of opening the file, a file access location may be set to another location different from 0 by means of system invoking. In a process of accessing the file (reading/writing the file), the process may set the file access location according to the file handle by means of system invoking. A person skilled in the art knows that in a case of random access, the access location may be any access location that is set by means of system invoking. In a case of sequential access, a currently accessed access location is an end location of previous access. In a process of performing the read operation or the write operation on the object file, the process may find, according to the file handle of the object file, the description information of the object file in the file handle array maintained by the process. Information such as the metadata and the access location of the file is found in the file description information, so that the read operation or the write operation on the object file is implemented. It may be understood that the file handle is a file identifier for identifying the object file in a process in which the current process reads/writes the object file. In this embodiment of the present disclosure, the file identifier may alternatively be another file descriptor different from the file handle. This is not limited herein, provided that the process can identify the object file by using the file identifier and find the description information of the object file.

As described above, because the internal memory has the advantage of a fast access speed, the internal memory (for example, the DRAM 120 and the PCM 125 in FIG. 1) may be configured to store various software that is running on the operating system, and input and output data, and information exchanged with external storage. Therefore, when accessing the object file, the operating system running on the computer system 100 first loads file data of the to-be-accessed object file from the disk 130 to the internal memory. In this embodiment of the present disclosure, a memory page in the internal memory that is configured to cache the file data may be referred to as a cache page. For ease of description, an example in which the file data of the object file is loaded onto the DRAM 120 is used below for description. For example, as shown in FIG. 2, a "cache page 1" and a "cache page 2" in the DRAM 120 are both configured to cache file data 210 of a "file 1". Therefore, the "cache page 1" and "the cache page 2" are both cache pages of the "file 1" stored in the disk 130. It may be understood that file data cached in different cache pages is different. Usually, a size of one page is 4 KB, that is, one page has 4096 bytes. In this embodiment of the present disclosure, a size of one cache page is also usually 4 KB. In actual application, the size of the cache page may alternatively be set to 8 KB or 16 KB. The size of the cache page is not limited herein.

The access request processing process provided in this embodiment of the present disclosure is mainly related to the process of performing the write operation or the read operation on the object file according to the write request and the read request of the object file after the object file is opened. As shown in FIG. 2 and step 300 in FIG. 3, when receiving a write request 200, the CPU 105 may invoke data processing logic 1051 to process the write request 200. The write request 200 carries a file identifier, a buffer pointer, and a size of to-be-written data. The file identifier is a file handle that is allocated to an object file when a process opens the object file that is to be accessed according to the write request 200. The process can find the file description information of the object file according to the file identifier. The buffer pointer is used to point to a buffer for caching the to-be-written data. A person skilled in the art may know that the buffer may be storage space that is obtained by division in the DRAM 120 or the PCM 125. The size of the to-be-written data is a length of the buffer for caching the to-be-written data. For example, the size of the to-be-written data may be 100 bytes.

In step 305, the CPU 105 obtains an access location according to the file identifier. The access location is used to indicate a start address for writing data into the object file according to the write request 200. In this embodiment of the present disclosure, after receiving the write request 200, the CPU 105 may use the file identifier carried in the write request 200 as an index, find description information of the object file by using a file handle array maintained by a process, and find, in the description information of the object file, the access location in the object file that is to be accessed according to the write request 200. The access location is a start address for writing data into the object file according to the write request 200. In this embodiment of the present disclosure, the access location may be a logical access location. For example, the access location may be an $89^{th}$ byte of a first file.

In step 310, the CPU 105 determines, according to the access location, the size of the to-be-written data, and a size of a cache page, N object cache pages and a log data chunk $log_i(x, y)$ that corresponds to an object cache page ($OCP_i$) of the N object cache pages. A value of i ranges from 1 to N, N is an integer not less than 1, x represents a start offset of the log data chunk relative to the file page, and y represents a length of the log data chunk. For example, if the log data chunk is a $log_i(10, 30)$, it indicates that the start offset of the log data chunk is a $10^{th}$ byte of a first object cache page, and the length of the log data chunk is 30 bytes. In this step, after obtaining the access location of the write request 200, the CPU 105 may calculate, according to the access location, the size of the to-be-written data, and the size of the cache page, a logical page number of an object cache page that is to be accessed according to the write request 200, so that the CPU 105 can determine, according to the calculated logical page number, the object cache page that is to be accessed according to the write request 200. As described above, the cache page is a memory page, configured to cache file data, in the internal memory. Therefore, in this embodiment of the present disclosure, the object cache pages are memory pages in the internal memory that are used to cache file data that is in the object file and that is modified by the to-be-written data.

For example, if the access location is the $89^{th}$ byte of the first file, the size of the to-be-written data is 212 bytes. That is, according to the write request 200, 212 bytes need to be written into the first file starting from the $89^{th}$ byte of the first file. For ease of description, an example in which the size of one cache page is 100 bytes is used for description. In this manner, a $0^{th}$ to a $99^{th}$ bytes of the first file form a first page $p^1$ of the first file, a $100^{th}$ to a $199^{th}$ bytes of the first file form a second page $p^2$ of the first file, a $200^{th}$ to a $299^{th}$ bytes of the first file form a third page $p^3$ of the first file, a $300^{th}$ to a $399^{th}$ byte of the first file form a fourth page $p^4$ of the first file, and so on. Therefore, the CPU 105 may calculate, according to the access location, the size of the to-be-written data, and the size of the cache page, the first page to the fourth page of the first file that is to be accessed according to the write request. That is, the first page to the fourth page of the first file are determined as object cache pages, and the value of i ranges from 1 to 4.

Further, the CPU 105 may determine four data chunks a $\log_1(89, 11)$, a $\log_2(0, 100)$, a $\log_3(0, 100)$, and a $\log_4(0, 1)$ that are respectively written into the first page to the fourth page of the first file. In an embodiment, the CPU 105 may determine the log data chunk $\log_1(89, 11)$ to be written into the first page, the log data chunk $\log_2(0, 100)$ to be written into the second page, the log data chunk $\log_3(0, 100)$ to be written into the third page, and the log data chunk $\log_4(0,1)$ to be written into the fourth page. The $\log_1(89, 11)$ is used to indicate 11 bytes starting from an $89^{th}$ byte of the first page, $\log_2(0, 100)$ is used to indicate 100 bytes starting from a $0^{th}$ byte of the second page, $\log_3(0, 100)$ is used to indicate 100 bytes starting from a $0^{th}$ byte of the third page, and $\log_4(0, 1)$ is used to indicate 1 byte starting from a $0^{th}$ byte of the fourth page. In this embodiment of the present disclosure, the log data chunk is a data set to be written into each object cache page. That is, the log data chunk is modified data of each object cache page.

Figure 4:
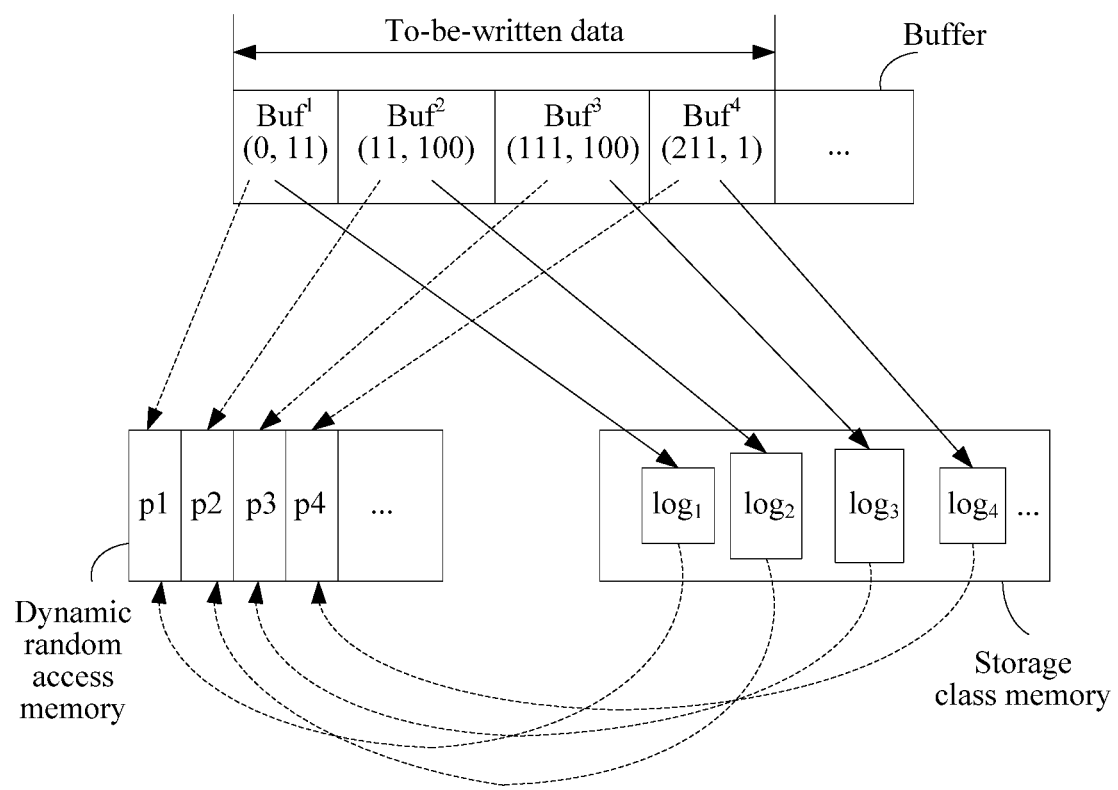
FIG. 4 is a schematic diagram of data processing according to an embodiment of the present disclosure.

In step 315, the CPU 105 determines location information of each log data chunk $\log_i(x, y)$ corresponding to the object cache page $OCP_i$. After obtaining the log data chunk $\log_i(x, y)$ corresponding to the object cache page $OCP_i$, the CPU 105 may further divide the to-be-written data cached in the buffer into four parts according to a size of a data chunk to be written into each object cache page, to obtain location information of a log data chunk corresponding to each object cache page. The location information of the log data chunk is a location, of data to be written into each object cache page, in the buffer to which the buffer pointer carried in the write request 200 points. For example, as shown in FIG. 4, the CPU 105 can divide, according to information about the data chunks to be written into the four pages, the to-be-written data cached in the buffer into four parts, a $buf^1(0, 11)$, a $buf^2(11, 100)$, a $buf^3(111, 100)$, and a $buf^4(211, 1)$, to obtain location information of each log data chunk. The $buf^1(0, 11)$ is used to indicate that data of the $\log_1(89, 11)$ is 11 bytes starting from a $0^{th}$ byte in the buffer, the $buf^2(11, 100)$ is used to indicate that data of the $\log_2(0, 100)$ is 100 bytes starting from the $11^{th}$ byte in the buffer, the $buf^3(111, 100)$ is used to indicate that data of the $\log_3(0, 100)$ is 100 bytes starting from the $111^{th}$ byte in the buffer, and the $buf^4(211, 1)$ is used to indicate that data of the $\log_4(0, 1)$ is 1 byte starting from the $211^{th}$ byte in the buffer.

It may be understood that in actual application, there may be one or more object cache pages that are to be accessed according to the write request 200. That is, a value of N may be an integer not less than 1. That is, to-be-written data carried in an access request may be data to be written into only one page, or may be data that needs to be written into multiple pages. An example in which data is written into multiple object cache pages is used above for description. In another case, an example in which the access location is the $89^{th}$ byte of the first file and a size of one page is 100 bytes is used. If the size of the to-be-written data is 5 bytes, the CPU 105 needs to write, according to the write request 200, 5 bytes into the first file starting from the $89^{th}$ byte of the first file. In this case, the CPU 105 modifies only the first page of the first file, that is, N=1. Therefore, the CPU 105 may calculate, according to the access location, the size of the to-be-written data, and the size of the cache page, that the log data chunk written into the first page is $\log_1(89, 5)$. Further, the CPU 105 may obtain location information buf(0, 5) of a log data chunk written into the object cache page. The location information is the buffer to which the buffer pointer carried in the write request 200 points.

In step 320, the CPU 105 determines whether the PCM 125 stores a log chain of the object cache page $OCP_i$. The log chain of the object cache page $OCP_i$ is used to record information about at least one data modification to the object cache page $OCP_i$. When the PCM 125 does not store the log chain of the object cache page $OCP_i$, the method goes to step 325. When the PCM 125 stores the log chain of the object cache page $OCP_i$, the method goes to step 330. A person skilled in the art may know that, after receiving the write request 200, the CPU 105 may further obtain metadata information of the object file according to the file identifier carried in the write request 200. In this embodiment of the present disclosure, the metadata information of the object file includes information about a cache page structure of the object file. After determining, in step 210, the N object cache pages that are to be accessed according to the write request 200, the CPU 105 may obtain cache page structures of the N object cache pages from the metadata information of the object file, and further can determine, according to information recorded in the cache page structures, whether the PCM 125 stores the log chain of the object cache page $OCP_i$.

Figure 5:
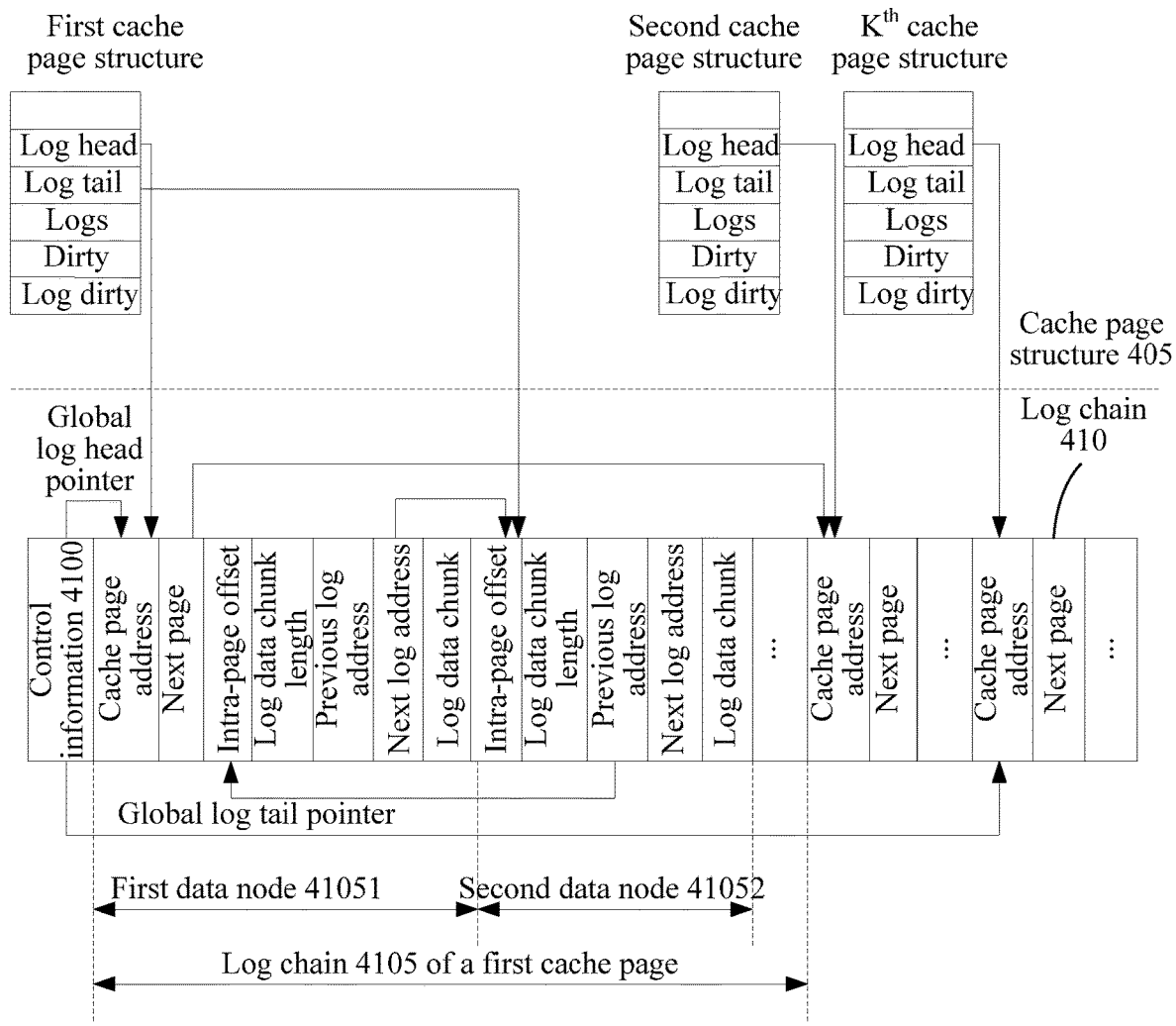
FIG. 5 is a schematic diagram of a cache page structure and a log chain structure according to an embodiment of the present disclosure.

FIG. 5 is a schematic diagram of a cache page structure and a log chain structure according to an embodiment of the present disclosure. In this embodiment of the present disclosure, as shown in FIG. 2, a cache page may be cached in the DRAM 120, and a log chain of the cache page may be stored in the PCM 125. As shown in FIG. 5, a cache page structure 405 shows cache page structures of multiple cache pages, for example, a first cache page structure, a second cache page structure, and an $N^{th}$ cache page structure that are shown in FIG. 5. N is an integer greater than 2. A person skilled in the art may know that the cache page structure is used to describe metadata information of a cache page. For example, the cache page structure may be used to describe information such as an offset location of a cache page, a size of the cache page, and whether the cache page is locked. In this embodiment of the present disclosure, each cache page has a corresponding cache page structure, and each cache page structure further includes information about a log chain of the cache page. In an embodiment, each cache page structure includes at least the following fields, log head, log tail, logs, dirty, and log dirty. The several fields are separately described below.

The "log head" field is used to point to a first address of the log chain (log chain) of the cache page. The log chain is stored in the PCM 125. The first address of the log chain of the cache page may include an inode of a file to which the cache page belongs and a logical page number of the cache page. The inode of the file is used to determine the file to which the cache page belongs. The logical page number is used to determine the cache page.

The "log tail" field is used to point to a first address of a last data node in the log chain of the cache page. In this embodiment of the present disclosure, a log chain of each cache page includes a data node that is dynamically generated during at least one modification to the cache page. A data node is used to record information about a log data chunk of the cache page during one modification. The log data chunk is modified data of the cache page during one modification. Each data node includes a data field storing the log data chunk, a pointer field storing an address of another data node, and another information field. The another information field may be used to store other information such as an address of the data node.

The "logs" field is used to indicate a quantity of data nodes in the log chain of the cache page.

The "dirty" field is used to indicate whether there is dirty data in the cache page. That is, "dirty" is used to indicate whether the cache page is synchronous with file data in a disk. For example, when an indication bit of "dirty" is 1, it indicates that there is dirty data in the cache page, and that the data in the cache page is inconsistent with the file data in the disk. When the indication bit of "dirty" is 0, it indicates that the data in the cache page is consistent with the file data in the disk.

The "log dirty" field is used to indicate whether the cache page is synchronous with a log data chunk indicated by a data node of the log chain of the cache page are synchronous. For example, when the "log dirty" field is 1, it indicates that there is new data in the log data chunk indicated by the data node of the log chain of the cache page, and that data in the data node is inconsistent with data in the cache page. When the "log dirty" field is 0, it indicates that the log data chunk indicated by the data node of the log chain of the cache page is consistent with the data in the cache page. That is, when the "log dirty" field is 1, it indicates that the log data chunk indicated by the data node of the log chain of the cache page has not been updated to the cache page. When the "log dirty" field is 0, it indicates that the log data chunk indicated by the data node of the log chain of the cache page has been updated to the cache page.

In this embodiment of the present disclosure, after determining an object cache page, for example, one object cache page, the CPU 105 may obtain a cache page structure of the object cache page from metadata information of the object file, so that the CPU 105 can determine, according to an indication bit of "log head" or an indication bit of "log tail" in the cache page structure of the object cache page, whether the PCM 125 stores a log chain of the object cache page. In an embodiment, when the CPU 105 determines, in the cache page structure of the object cache page $OCP_i$, that "log head" or "log tail" is empty, it may be determined that the object cache page $OCP_i$ has not been modified, and the object cache page has no log chain. When the CPU 105 determines, in the cache page structure of the object cache page $OCP_i$, that "log head" or "log tail" includes an address, it indicates that the object cache page has been modified, and the CPU 105 may find the log chain of the object cache page $OCP_i$ according to an address pointer recorded in the "log head" field. An example in which a first cache page shown in FIG. 5 is the object cache page is used. When a log head of a first cache page structure is empty, it indicates that the first cache page has no log chain. When a log head of the first cache page structure includes an address, it indicates that the PCM 125 stores the log chain of the first cache page. It may be understood that in actual application, whether the object cache page has a log chain may alternatively be determined by using a field such as "logs" or "log dirty" in the cache page structure of the object cache page. For example, when the logs field is 0, it indicates that the object cache page has no log chain. When the "logs" field is not 0, it indicates that the object cache page has a log chain. A specific manner of determining whether the PCM 125 stores the log chain of the object cache page is not limited in this embodiment of the present disclosure.

In step 325, the CPU 105 creates, in the PCM 125, the log chain for the object cache page $OCP_i$. When determining, in step 320 according to the information in the cache page structure of the object cache page, that the PCM 125 does not store the log chain of the object cache page $OCP_i$, the CPU 105 may create, in the PCM 125, the log chain for the object cache page. During creation of the log chain for the object cache page, physical space may be allocated in the PCM 125 according to the size of the to-be-written data, and a data structure of the log chain is initialized in the allocated physical space.

In this embodiment of the present disclosure, the PCM 125 stores a log chain of each updated cache page. That is, each updated cache page has a log chain. The log chain is used to record information about at least one modification to the cache page. As shown in FIG. 5, in actual application, a global log chain structure may be created for a file system. For details, refer to 410 in FIG. 5. The global log chain structure 410 includes log chains of multiple cache pages. A log chain of each cache page may be considered as a node or a sub-log chain in the global log chain. The global log chain structure 410 may include control information 4100 and the log chain of each cache page. The control information 4100 includes a global log head pointer and a global log tail pointer. The global log head pointer is used to point to a head of a log chain of a first cache page in the global log chain structure 410. In an embodiment, the global log head pointer is used to point to a first address of the global log chain structure in the PCM 125. The global log tail pointer is used to point to a first address of a log chain of a last cache page in the global log chain structure 410. In this embodiment of the present disclosure, a first address of a log chain of a cache page is a cache page address shown in FIG. 5. The cache page address may include an inode of a file to which the cache page belongs and a logical page number of the cache page. The inode of the file is used to determine the file to which the cache page belongs, and the logical page number is used to determine the cache page.

As shown in FIG. 5, a log chain of each cache page includes a data node that is generated during at least one modification to the cache page. The data node includes information about a log data chunk and information such as a pointer pointing to another data node. The information about the log data chunk may include the log data chunk or a storage address of the log data chunk in the PCM 125. In actual application, after the CPU 105 creates a log chain for a cache page, a global log tail pointer in the control information of the global log chain needs to point to a first address of the newly created log chain structure of the cache page. In this manner, created log chains of the newly created cache page may be put in the global log chain of the file system according to a creation time sequence, so that data written into the computer system can be recovered according to log chains of cache pages in the global log chain in a recovery process after the computer system becomes faulty, so as to retain data consistency, and facilitate system management.

For ease of description, a log chain structure of each cache page is described by using a log chain 4105 of the first cache page in FIG. 5 as an example. As shown in FIG. 5, the log chain 4105 of the first cache page includes a first data node 41051 and a second data node 41052. The first data node 41051 and the second data node 41052 may each include information about a log data chunk, a pointer pointing to another data node, information about a logical location of the log data chunk, and the like. It may be understood that one log data chunk may be obtained by one modification to the first cache page. In this embodiment of the present disclosure, the log data chunk obtained during the modification to the first cache page may be recorded in the log chain 4105 of the first cache page. For example, a first log data chunk obtained during a first modification to the first cache page may be stored in the first data node 41051, and a second log data chunk obtained during a second modification to the first cache page may be stored in the second data node 41052.

In this embodiment of the present disclosure, a "log data chunk" field in the log chain is used to record information about current modified data of the cache page. For example, as shown in FIG. 5, "log data chunk" in the first data node 41051 is used to indicate first modified data of the first cache page, "log data chunk" in the second data node 41052 is used to indicate second modified data of the first cache page. In actual application, in a case, modified data may be directly recorded in a "log data chunk" part. In another case, modified data may be alternatively stored in other storage space in the PCM 125, and then, an address of the modified data is recorded in a "log data chunk" part. A data storage manner in the log chain structure is not limited in this embodiment of the present disclosure, provided that data of multiple modifications to the cache page can be found according to the log chain.

In a process of recording log data chunks in a log chain, the log data chunks may be sequentially recorded according to a sequence of modifying object cache pages. In this embodiment of the present disclosure, to record the sequence of modifying the object cache pages, each data node in the log chain includes information about a pointer pointing to another data node. The pointer pointing to the another data node may include the following fields, a previous log address, a next log address, and the like. The "previous log address" is used to indicate an address of a previous data node. In an embodiment, the "previous log address" is used to indicate a start address of the previous data node in an SCM. For example, as shown in FIG. 5, an "intra-page offset" field is a first field in the data node. Therefore, the "previous log address" may point to an "intra-page offset" field in a log data chunk in the previous data node. The previous data node is a previously inserted data node of the current data node, and is used to indicate information about modified data during a previous modification to an object cache page. The "next log address" is used to indicate an address of a next data node. In an embodiment, the "next log address" is used to indicate a start address of the next data node in the SCM. For example, as shown in FIG. 5, the "next log address" may point to an "intra-page offset" field in a log data chunk in the next data node. The next data node is a next inserted data node of the current data node, and is used to indicate information about modified data during a next modification to the object cache page. It may be understood that a "previous log address" field in a first data node in a log chain structure of a cache page is empty. For example, the first data node 41051 in FIG. 5 is the first data node in the log chain 4105 of the first cache page. Therefore, in the first data node 41051, an indication bit of the "previous log address" is empty. Similarly, a "next log address" field in a last data node in a log chain of a cache page is empty. When an indication bit of a "next log address" in a data node is empty, it indicates that the data node is a last modification to a cache page corresponding to the data node.

In this embodiment of the present disclosure, to record specific information about a log data chunk in an object cache page, each data node further includes information about an intra-page location of the log data chunk. The information about the intra-page location of the log data chunk may include information such as an intra-page offset and a log data length. The intra-page location of the log data chunk is a location of the log data chunk in the object cache page. In an embodiment, the "intra-page offset" is used to indicate a start location of the log data chunk in the cache page. The "log data length" is used to indicate length information of the log data chunk.

In this embodiment of the present disclosure, to establish an association between the log chain of the cache page and the cache page, in a log chain of each cache page, a first data node of the cache page further includes information about "cache page address". The information about "cache page address" may include an inode of a file and a logical page number. The inode of the file is used to indicate the file to which the log chain belongs, and the logical page number is used to indicate a cache page to which the log chain belongs. As shown in FIG. 5, a "cache page address" field in the first data node 41051 of the first cache page includes an inode of a file to which the first cache page belongs and a logical page number of the first cache page. Further, to establish an association between log chains of multiple cache pages, the first data node of each cache page further includes pointer information indicating a next page. The "next page" is used to indicate a first data node in a log chain of a next modified cache page of the file in a file system. The log chain of the next modified cache page in the file system can be found according to a pointer of the "next page".

In step 330, the CPU 105 inserts a data node into the log chain of the object cache page OCP$_i$. The inserted data node includes information about the log data chunk log, (x, y). In this embodiment of the present disclosure, in a case, after the CPU 105 creates, in the PCM 125, the log chain for the object cache page OCP$_i$, the method may go to step 330, so that the CPU 105 inserts a data node into the created log chain, and records information about the log data chunk during the current modification. In another case, when the CPU 105 determines, in step 320, that the PCM 125 stores the log chain of the object cache page OCP$_i$, the method may go to step 330, and the CPU 105 may insert a data node into the existing log chain of the object cache page OCP$_i$, and record information about the log data chunk during the current modification. The information about the log data chunk may include the log data chunk or a storage address of the log data chunk in the PCM 125. The information about the log data chunk may further include information such as a pointer pointing to another data node, and a location of the log data chunk. For example, after creating the log chain for the first cache page, the CPU 105 may record information about the first log data chunk in the log chain structure of the first cache page. In an embodiment, data of the first log data chunk may be directly recorded in the "log data chunk" field in the first data node 41051, or a storage address of the first log data chunk in the PCM 125 may be recorded in the "log data chunk" field of the first data node 41051. This is not limited herein. In addition, information such as a location and a length of the first log data chunk, and the pointer pointing to the another data node may further be recorded in the first data node 41051.

For clarity of description, an example in which the foregoing log data chunk to be written into the first page is $log_1(89, 11)$, and the first page is the first cache page shown in FIG. 4 is used. After creating the log chain 4105 for the first cache page, the CPU 105 may record an inode of the first file and the logical page number of the first cache page in a "cache page address" field of the first data node 41051, record 89 in an "intra-page offset" field of the first data node 41051, record 11 in a "log data length" field, and record data of $buf^1(0, 11)$ in a "log data chunk" field, or record, in a "log data chunk" field, a storage address of the data chunk $log_1(89, 11)$ in the PCM 125.

A person skilled in the art may know that nodes in a linked list structure may be dynamically generated and inserted in a system running process. Therefore, data nodes in the log chain 4105 of the first cache page may also be dynamically generated and inserted. When a data node is generated, a pointer in an existing data node in the linked list that points to another data node needs to be correspondingly updated, and in addition, a log tail pointer in the cache page structure also needs to be updated. For example, the first data node 41051 is the first data node of the first cache page. Therefore, when the first data node 41051 is created, the "previous log address" and the "next log address" in the first data node 41051 are empty. In the system running process, after the second data node 41052 is dynamically generated, a pointer of the "next log address" in the first data node 41051 may be updated according to the second data node 41052, so that the pointer of the "next log address" in the first data node 41051 points to a start address of the second data node 41052 in the PCM 125. In addition, the log tail pointer in the first cache page structure further needs to be updated to pointing to the start address of the second data node 41052 in the PCM 125. In an embodiment, the "intra-page offset" field is the first field of the second data node 41052. Therefore, a pointer of the "next log address" in the first data node 41051 may point to the "intra-page offset" field in the second data node 41052, and the log tail pointer in the first cache page structure is updated to pointing to the "intra-page offset" field in the second data node 41052. The "intra-page offset" is used to indicate a location of the log data chunk of the second data node 41052 in the first cache page.

In this embodiment of the present disclosure, when the CPU 105 determines, in step 320, that the PCM 125 stores the log chain of the object cache page $OCP_i$, in this step, the CPU 105 may insert a data node into a tail of the existing log chain of the object cache page $OCP_i$, and record information about the log data chunk during the current modification. For example, in step 320, when the log tail field in the first cache page structure is not empty, the CPU 105 may determine that the PCM 125 stores the log chain structure of the first cache page. That is, when the log tail field in the first cache page structure is not empty, it indicates that the first cache page has been modified before the current modification. In this case, in this step, the CPU 105 may find the last data node in the log chain 4105 of the first cache page according to the log tail field in the first cache page structure. In this embodiment of the present disclosure, the last data node of the first cache page stores information about data of a modification closest to a current time, or the last data node of the first cache page stores a last modification version of the first cache page. After finding the last data node of the first cache page, the CPU 105 may add a new data node after the last data node, and store the information about the data chunk $log_i(x, y)$ in the added new data node. An example in which the last data node in the log chain of the first cache page is the first data node 41051, the new modified data is the data chunk $log_i(x, y)$, and the new data node is the second data node 41052 is used. The CPU 105 may store the information about the data chunk $log_i(x, y)$ in the second data node 41052. The log data chunk $log_i(x, y)$ (also referred to as the second log data chunk) stored in the data node 41052 is modified data of the first object cache page during the current modification. In an embodiment, the second log data chunk is at least partial to-be-written data that is obtained from the buffer to which the buffer pointer points. The information about the data chunk $log_i(x, y)$ may include the data chunk $log_i(x, y)$, a log data length, an intra-page offset, and information about a pointer pointing to another data node. In this embodiment of the present disclosure, after inserting the new data node, the CPU 105 may update the cache page structure of the object cache page $OCP_i$ according to the newly inserted data node. In an embodiment, the CPU 105 may enable the log tail pointer of the cache page to point to an "intra-page offset" in the newly inserted data node, and update a quantity of data nodes in the cache page structure of the $OCP_i$. For example, after inserting the second data node 41052 into the log chain 4105 of the first cache page, the CPU 105 may enable the "log tail" field in the cache page structure of the first cache page to point to the "intra-page offset" in the second data node 41052, and update the indication bit of "logs" in the cache page structure of the first cache page. An updated indication bit of "logs" is used to indicate that the log chain of the first cache page includes two data nodes.

It may be understood that the manner, provided in this embodiment of the present disclosure, of sequentially recording modified data of an object cache page in a log chain according to a modification sequence helps identify different updated versions of the object cache page by using an order of data nodes in the log chain. In actual application, in a process of sequentially inserting data nodes, in addition to the sequence of sequentially inserting the data nodes at a tail of the log chain in a head-to-tail order, the data nodes may be sequentially inserted at a head of the log chain in a tail-to-head order. A specific insertion order is not limited in this embodiment of the present disclosure, provided that an update sequence of the object cache page can be identified according to the data nodes in the log chain.

After inserting the new data node into the log chain of the object cache page $OCP_i$ in step 330, as shown in step 335, the CPU 105 may further determine whether the log chain of the object cache page $OCP_i$ includes at least two data nodes. In an embodiment, in step 335, the CPU 105 may perform determining according to an indication bit of "logs" in the cache page structure of the object cache page $OCP_i$. When the CPU 105 determines that the log chain of the object cache page $OCP_i$ includes at least two data nodes, the method goes to step 340. When determining that the log chain of the object cache page $OCP_i$ does not include at least two data nodes, the CPU 105 performs step 300 again, to process a next access request.

In step 340, the CPU 105 determines whether the intra-page location of the log data chunk log, recorded in the inserted data node overlaps an intra-page location of a log data chunk recorded in the another data node. As described above, the intra-page location of the log data chunk is a location of the log data chunk in the object cache page. The intra-page location of the log data chunk may be obtained according to two of the following information, an "intra-page offset" and a "log data length" in the log chain. For example, as shown in FIG. 4, if an "intra-page offset" of the first data node 41051 is 30, and a "log data length" is 40, an intra-page location of the log data chunk in the first data node 41051 is a $30^{th}$ to a $70^{th}$ bytes in the first cache page. After inserting the new data node into the log chain of the object cache page in step 330, in step 340, the CPU 105 may determine, according to information about the intra-page location of the log data chunk recorded in data nodes in the log chain, whether the intra-page location of the log data chunk log, recorded in the newly inserted data node overlaps an intra-page location of a log data chunk recorded in another data node. In actual application, the CPU 105 may compare the intra-page location of the log data chunk log, recorded in the newly inserted data node with an intra-page location of a log data chunk recorded in another data node. For example, as shown in FIG. 4, the CPU 105 may compare the intra-page location of the log data chunk recorded in the second data node 41052 with the intra-page location of the log data chunk recorded in the first data node 41051, and determine whether the intra-page location of the log data chunk recorded in the second data node 41052 overlaps the intra-page location of the log data chunk recorded in the first data node 41051. In this step, if the CPU 105 determines that the intra-page location of the log data chunk log, recorded in the inserted data node overlaps the intra-page location of the log data chunk recorded in the another data node, the method goes to step 345. If determining that the intra-page location of the log data chunk log, recorded in the inserted data node does not overlap the intra-page location of the log data chunk recorded in the another data node, the CPU 105 performs step 330 again, to process a next access request. In this embodiment of the present disclosure, if the CPU 105 determines that the intra-page location of the log data chunk log, recorded in the inserted data node does not overlap the intra-page location of the log data chunk recorded in the another data node, it indicates that the log data chunk recorded in the newly inserted data node and the log data chunk recorded in the another data node in the log chain are both latest modified data of the object cache page.

In step 345, the CPU 105 sets, in the another data node, data that is in the log data chunk recorded in the another data node and that overlaps the log data chunk in the inserted data node to invalid data, so that the data recorded in the log chain of the object cache page $OCP_i$ is the latest modified data. In an embodiment, in this step, the CPU 105 may set the data that is in the log data chunk recorded in the another data node and that overlaps the log data chunk in the inserted data node to invalid data in the following listed manners. For ease of description, the first data node 41051 and the second data node 41052 in the log chain 4105 of the first cache page shown in FIG. 4 are used as an example for description below. An example in which the second data node 41052 is the newly inserted data node in the process in which the CPU 105 processes the write request 200 is used.

In a case, the intra-page location of the log data chunk recorded in the second data node 41052 includes the intra-page location of the log data chunk recorded in the first data node 41051. That is, the log data chunk recorded in the first data node 41051 is completely covered by the log data chunk recorded in the second data node 41052 newly inserted in the current processing process of the write request. That is, in a current write-operation process, the CPU 105 rewrites, according to the write request 200, all data in the log data chunk recorded in the first data node 41051. For example, if the intra-page location of the log data chunk recorded in the first data node 41051 is a $30^{th}$ to a $60^{th}$ bytes of the first cache page, and the intra-page location of the log data chunk recorded in the second data node 41052 is a $20^{th}$ to an $80^{th}$ bytes of the first cache page, the intra-page location of the log data chunk recorded in the second data node 41052 includes the intra-page location of the log data chunk recorded in the first data node 41051. In this case, the CPU 105 may set the data that is in the log data chunk recorded in the another data node and that overlaps the log data chunk in the inserted data node to invalid data in the following manners, (1) the CPU 105 may delete the first data node 41051, (2) the CPU 105 may add an invalid flag bit to the first data node 41051, where the invalid flag bit is used to indicate that data recorded in the first data node 41051 is invalid, and (3) the CPU 105 may modify information about the "log data length" in the first data node 41051 into 0, to indicate that the first data node 41051 does not include modified data.

In another case, the intra-page location of the log data chunk recorded in the second data node 41052 partially overlaps the intra-page location of the log data chunk recorded in the first data node 41051. That is, in the current write-operation process, the CPU 105 partially modifies, according to the write request 200, the log data chunk recorded in the first data node 41051. In this case, the CPU 105 may modify information about the intra-page location of the log data chunk in the first data node 41051 according to the intra-page location of the data that is in the log data chunk in the first data node 41051 and that overlaps the log data chunk in the second data node 41052, to set the data that is in the log data chunk recorded in the first data node 41051 and that overlaps the log data chunk in the inserted second data node 41052 to invalid data. In an embodiment, the CPU 105 may modify at least one of the "intra-page offset" or the "log data length" field in the first data node 41051, to set the data that is in the log data chunk recorded in the first data node 41051 and that overlaps the log data chunk in the inserted second data node 41052 to invalid data. For example, if the intra-page location of the log data chunk recorded in the first data node 41051 is a $30^{th}$ to a $60^{th}$ bytes of the first cache page, and the intra-page location of the log data chunk recorded in the second data node 41052 is a $50^{th}$ to an $80^{th}$ bytes of the first cache page, it is determined that the intra-page location of the log data chunk recorded in the second data node 41052 partially overlaps the intra-page location of the log data chunk recorded in the first data node 41051. In this case, the CPU 105 may modify the "log data length" in the first data node 41051 from 30 bytes into 20 bytes. After the modification, an intra-page location of the log data chunk recorded in the first data node 41051 is 20 bytes starting from the $30^{th}$ byte of the first cache page. In this manner, the log data chunk recorded in the first data node 41051 is modified data from the $30^{th}$ to the $50^{th}$ bytes of the first cache page. The $50^{th}$ to the $60^{th}$ bytes of the first data node 41051 are set to invalid data in this manner.

In another case, the intra-page location of the log data chunk recorded in the first data node 41051 includes the intra-page location of the log data chunk recorded in the second data node 41052. That is, in the current write-operation process, the CPU 105 rewrites, according to the write request 200, only partial data in the log data chunk recorded in the first data node 41051. In this case, the CPU 105 may split the another data node into two data subnodes, to set data that is in the log data chunk recorded in the another data node and that overlaps the log data chunk in the inserted data node to invalid data. For example, the CPU 105 may split the first data node 41051 into a first data subnode and a second data subnode, where the first data subnode and the second data subnode that are obtained by means of splitting separately record data that is in the log data chunk in the first data node 41051 and that does not overlap the log data chunk in the second data node 41052, so as to set the data that is in the log data chunk in the first data node 41051 and that overlaps the log data chunk in the second data node 41052 to invalid data. Data structures of the first data subnode and the second data subnode are the same as a data structure of the first data node. The invalidated data in the first data node 41051 does not include information about the log data chunk recorded in the first data subnode and information about the log data chunk recorded in the second data subnode. It should be noted that the two data nodes obtained by means of splitting may be at a location of the first data node 41051 in the log chain. In an embodiment, after the first data node 41051 is split into the first data subnode and the second data subnode, information about a "previous log address" in the first data subnode is the same as information about a "previous log address" in the first data node 41051. A "next log address" in the first data subnode is used to point to a start address of the second data subnode. A "previous log address" in the second data subnode is used to point to a start address of the first data subnode. Information about a "next log address" in the second data subnode is the same as information about a "next log address" in the first data node 41051.

For example, if the intra-page location of the log data chunk recorded in the first data node 41051 is a $30^{th}$ to a $60^{th}$ bytes of the first cache page, and the intra-page location of the log data chunk recorded in the second data node 41052 is a $40^{th}$ to a $50^{th}$ bytes of the first cache page, the CPU 105 may determine that the intra-page location of the log data chunk recorded in the first data node 41051 includes the intra-page location of the log data chunk recorded in the second data node 41052. In this case, the CPU 105 may split the first data node 41051 into two data subnodes. A log data chunk recorded in the first data subnode is $log_1(30, 10)$, used to indicate modified data of 10 bytes starting from the $30^{th}$ byte of the first cache page. A log data chunk recorded in the second data subnode is $log_1(51, 10)$, used to indicate modified data of 10 bytes starting from the $51^{st}$ byte of the first cache page. In this manner, an "intra-page offset" of the log data chunk in the first data subnode is 30, and a "log data length" is 10. An "intra-page offset" of the log data chunk in the second data subnode is 51, and a "log data length" is 10. Therefore, the $40^{th}$ to the $50^{th}$ bytes (data partially overlapping the log data chunk in the second data node 41052) of the first data node 41051 are set to invalid data in this manner.

It may be understood that the foregoing cases are merely some manners of invalidating data that are provided in this embodiment of the present disclosure. In actual application, after it is determined that an intra-page location of a log data chunk in a newly inserted data node overlaps an intra-page location of a log data chunk recorded in another data node in a log chain, another manner, for example, deleting data in an overlapped area, may be used to invalidate data in an overlapped part recorded in the another data node. A specific manner of invalidating data is not limited in this embodiment of the present disclosure. According to the method provided in this embodiment of the present disclosure, when a new data node is inserted into the log chain of the object cache page, a log data chunk recorded in the newly inserted data node is compared with a log data chunk recorded in another data node, and partial data that is in the another data node and that overlaps the log data chunk in the newly inserted data node is invalidated, so that the log chain of the object cache page may record only latest modified data of the object cache page.

It may be understood that in a processing process of each write request, when a new data node is inserted into the log chain of the object cache page, a log data chunk in currently inserted data node needs to be compared with a log data chunk in an existing data node in the log chain, so as to invalidate data that is in the existing data node in the log chain and that overlaps the log data chunk in the currently inserted data node. In this manner, data recorded in each data node in the log chain of the object cache page may be the latest modified data of the object cache page. In addition, data nodes in the log chain are sequentially obtained according to a modification time sequence of cache pages. Therefore, in this manner, different modification versions of the object cache page may be determined according to the log data chunk recorded in the log chain of the object cache page.

In this embodiment of the present disclosure, after writing to-be-written data 205 into the PCM 125 according to the write request 200 (as shown in FIG. 2), the CPU 105 may return a write success message to an application. The write success message is used to indicate that the to-be-written data has been successfully written into a storage device. Therefore, a processing delay of an access request may be reduced. It may be understood that in actual application, the CPU 105 may return the write success message to the application after writing the to-be-written data into the log chain of the object cache page (as shown in step 330), or may return the write success message to the application after information about another data node in the log chain of the object cache page is updated according to the newly inserted data node (as shown in step 345).

It should be noted that in this embodiment of the present disclosure, for clarity of description, from step 320, an example in which the CPU 105 writes data into one object cache page is used for description. In actual application, when determining, in step 310, that there are multiple object cache pages, the CPU 105 may return to step 300 after sequentially performing step 320 to step 345 on each object cache page, so as to process a next access request.

In this embodiment of the present disclosure, when the CPU 105 needs to modify data of a file according to the access request, the CPU 105 does not directly write modified data into a cache page of the file. Instead, the CPU 105 writes the modified data into space of the PCM 125, and records information about modified data in each modification to the cache page in a log chain form. In addition, in this embodiment of the present disclosure, a log data chunk recorded in the log chain of the cache page is the latest modified data of the cache page. The PCM 125 is non-volatile, in this manner of storing the latest modified data of the object cache page in the PCM 125 by using the log chain, modified data of the object cache page during multiple modifications can be recorded according to a time sequence, so that it is convenient to identify a modification version of the object cache page, and consistency between the stored data and the written data is ensured. The computer system 100 provided in the present disclosure needs smaller system overheads in an access request processing process because compared with a write update process, status maintaining needs larger system overheads. In addition, a size of a log data chunk in this embodiment of the present disclosure may be smaller than a page. Therefore, modification to a file whose granularity is less than a page may be supported, and a modification manner is more flexible.

As shown in FIG. 2, in the computer system 100 provided in the embodiments of the present disclosure, after the to-be-written data 205 is written into the PCM 125 by using the method shown in FIG. 3, a merging operation may be triggered in some cases, to update the log data chunk in the PCM 125 to the cache page of the DRAM 120, and write a merged cache page into the disk 130. For example, in a case, to reduce system storage space, storage space of the PCM 125 needs to be reclaimed in time, and the log chain of the cache page is reclaimed. In this case, the CPU 105 first needs to update the log data chunk in the PCM 125 to the DRAM 120, then writes an updated cache page in the DRAM 120 into the disk 130, so as to update file data to the disk, and retain data consistency. In this embodiment of the present disclosure, when a specified condition is satisfied, for example, when a specified time arrives or storage space of the PCM 125 is less than a preset threshold, the CPU 105 may perform the foregoing data merging operation. In another case, when the computer system is faulty in a process of processing write data, after the computer system is restarted, data write-back recovery may be performed according to the log chain in the PCM 125, to ensure that written data is not lost, and retain data consistency. In this case, the log data chunk in the PCM 125 first needs to be updated to the cache page of the DRAM 120, and then the updated cache page is written into the disk 130.

Figure 6:
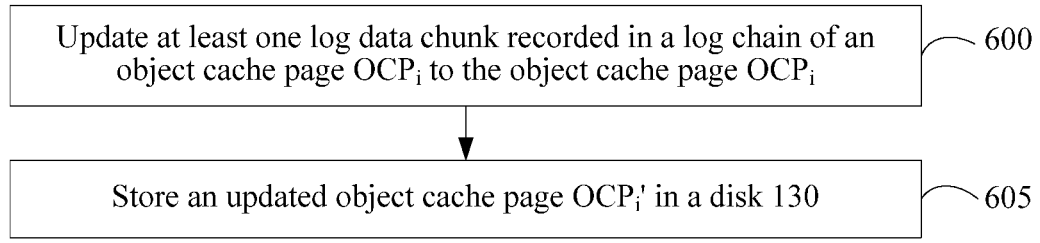
FIG. 6 is a flowchart of a data merging method according to an embodiment of the present disclosure.

The process, shown in FIG. 2, of updating the log data chunk 215 to the cache page of the DRAM 120 and writing the updated cache page into the disk 130 is described with reference to FIG. 6. FIG. 6 shows a data merging method according to an embodiment of the present disclosure. It may be understood that a merging operation may be performed, according to the method shown in FIG. 6, for each cache page having a log chain. For ease of description, a log chain of any object cache page $OCP_i$ in FIG. 3 is still used as an example for description.

In step 600, the CPU 105 updates at least one log data chunk 215 in the log chain to the object cache page according to information about the at least one log data chunk, to obtain an updated object cache page $OCP_i'$, where the information about the at least one log data chunk is recorded in the log chain of the object cache page $OCP_i$. In this embodiment of the present disclosure, the log data chunk 215 recorded in the log chain of the object cache page $OCP_i$ is the latest modified data of the object cache page. Therefore, in this step, the CPU 105 may update each log data chunk 215 to the object cache page according to information about an intra-page location of each log data chunk 215 recorded in the log chain of the object cache page $OCP_i$, to obtain the updated object cache page $OCP_i'$. In an embodiment, the CPU 105 may replace, with each log data chunk in the log chain, data that has a same location as the log data chunk and that is in the object cache page $OCP_i$, to obtain the updated object cache page. An example in which the log chain of the first cache page includes the first data node 41051 and the second data node 41052, the intra-page location of the log data chunk recorded in the first data node 41051 is a $30^{th}$ to a $50^{th}$ bytes, and the intra-page location of the log data chunk recorded in the second data node 41052 is an $80^{th}$ to a $90^{th}$ bytes is used. The CPU 105 may replace the $30^{th}$ to the $50^{th}$ bytes in the first cache page with the log data chunk recorded in the first data node 41051. In addition, the CPU 105 may replace the $80^{th}$ to the $90^{th}$ bytes in the first cache page with the log data chunk recorded in the second data node 41052, to obtain an updated first cache page.

After obtaining the updated object cache page, in step 605, the CPU 105 stores data 220 of the updated object cache page in the disk 130 of the computer system. In this manner, modified data may be written into the disk 130, to retain data consistency. In actual application, after the log data chunk recorded in the log chain of the object cache page is updated to the object cache page and written into the disk 130, the log chain of the object cache page may be reclaimed. For example, the CPU 105 may delete the log chain of the cache page, so that the storage space of the PCM 125 can be reclaimed.

In actual application, when storage space occupied by the log chain needs to be reclaimed, the CPU 105 may determine, by using a "dirty" field in a cache page structure of each cache page, whether data of the cache page needs to be flushed to the disk 130. A cache page is used as an example. When the "dirty" field is 1, the CPU 105 determines that the data of the cache page needs to be flushed to the disk 130. When the "dirty" field is not 0, the CPU 105 determines that the data of the cache page does not need to be written back to the disk 130. When determining that the data of the cache page needs to be flushed to the disk 130, the CPU 105 further needs to determine, according to a "log dirty" field in the cache page structure of the cache page, whether the log data chunk 215 in the PCM 125 needs to be updated to the cache page. For example, when the "log dirty" field is 1, it indicates that the PCM 125 includes newly modified data of the cache page, and the CPU 105 first needs to update the log data chunk 215 in the PCM 125 to the cache page in the DRAM 120, and then flush the data 220 of the updated cache page to the disk 130. When the "log dirty" field is 0, it indicates that the log data chunk 215 in the log chain of the cache page has been updated to the cache page, and the PCM 125 does not include the newly modified data of the cache page, and the CPU 105 may directly write the data in the cache page back to the disk 130.

It may be understood that in this embodiment of the present disclosure, after the to-be-written data 205 is written into the PCM 125, the write success message may be returned to the application. The log data chunk 215 in the log chain is not modified data using a page as a granularity. Therefore, modification of a small granularity to a file can be supported by using the access request processing method in the present disclosure. In addition, in this embodiment of the present disclosure, after the data is written into the PCM 125, the modified data in the PCM 125 is not immediately written into the disk 130. Instead, the log data chunk 215 stored in the PCM 125 is updated to a corresponding cache page when a condition is satisfied, and file data in the disk is updated according to the merged cache pages. Compared with an existing WAL manner and copy-on-write manner of retaining data consistency, this manner of delaying merged data and writing the merged data into a disk can reduce write amplification of a system.

As described above, in this embodiment of the present disclosure, after the computer system is restarted after a fault occurs, data write-back recovery may be performed according to the log chain in the PCM 125, to ensure that written data is not lost, and retain data consistency. In an embodiment, after the computer system is restarted after a fault occurs, the CPU 105 may sequentially perform, according to a global log head pointer in global log chain control information in the PCM 125, data recovery on each cache page having a log chain. In an embodiment, for any cache page having a log chain, the CPU 105 can traverse each log data chunk in the log chain of the cache page, update each log data chunk in the log chain to the cache page according to the method shown in FIG. 6, and then write data of the updated cache page into the disk 130. In this manner, it can be ensured that data is not lost.

Figure 7:
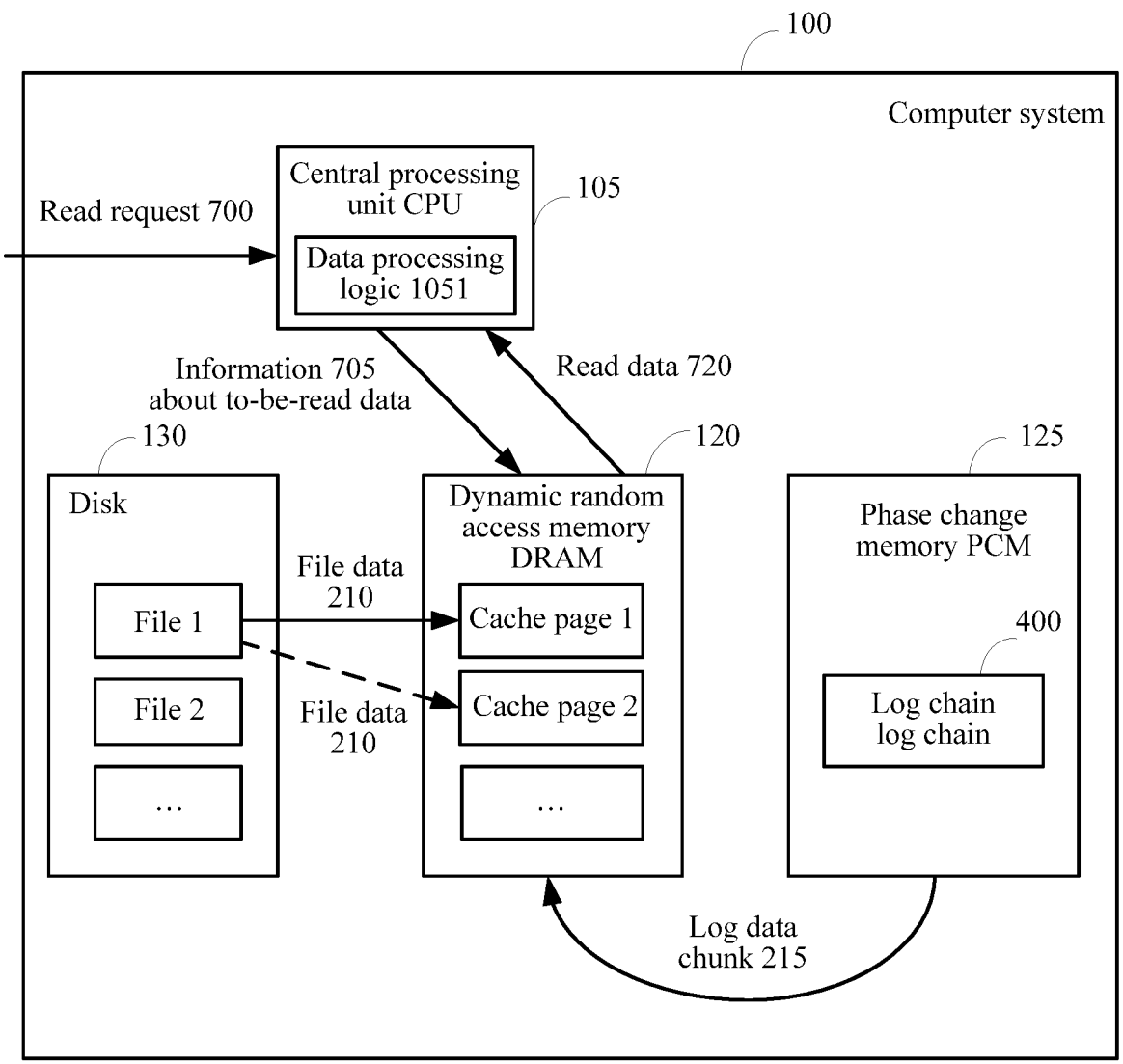
FIG. 7 is a schematic signaling diagram of another computer system according to an embodiment of the present disclosure.
Figure 8:
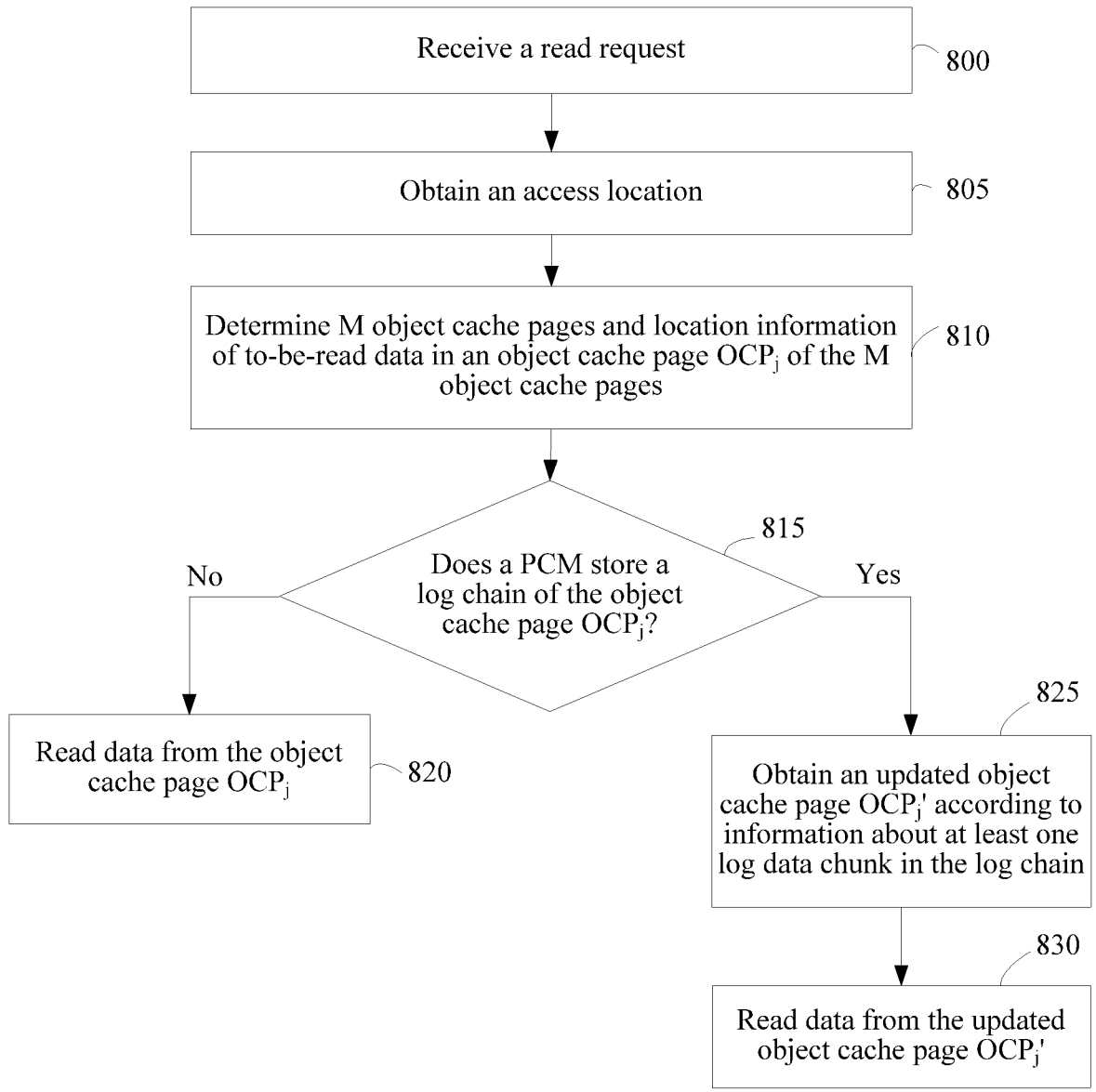
FIG. 8 is a flowchart of another access request processing method according to an embodiment of the present disclosure.

FIG. 2 and FIG. 3 describe the access request processing method provided in the embodiments of the present disclosure from the perspective of a process of writing data. The following further describes the access request processing method provided in the embodiments of the present disclosure from the perspective of a process of reading data. FIG. 7 is another schematic signaling diagram of a computer system 100 according to an embodiment of the present disclosure. FIG. 7 shows a signaling interworking process in a process in which components in the computer system 100 shown in FIG. 1 read data. FIG. 8 is a flowchart of another access request processing method according to an embodiment of the present disclosure. An example of data reading is used in FIG. 8. The method shown in FIG. 8 may be implemented by a CPU 105 in the computer system 100 shown in FIG. 7 by invoking data processing logic 1051. The following describes, in detail with reference to FIG. 7 and FIG. 8, how to read data from the computer system 100 provided in the embodiments of the present disclosure. As shown in FIG. 8, the method may include the following steps.

In step 800, the CPU 105 receives a read request 700. As shown in FIG. 7, when receiving the read request 700, the CPU 105 may invoke the data processing logic 1051 to process the read request 700. The read request carries a file identifier and a size of to-be-read data. For a detailed description of the file identifier, refer to the foregoing description. In the embodiment shown in FIG. 8, the file identifier carried in the read request 700 may be a file handle of a to-be-accessed object file, or may be another file descriptor different from the file handle. This is not limited herein, provided that a process can identify the object file by using the file identifier and find description information of the object file. For example, the file identifier carried in the read request 700 may be a file identifier of a second file in a disk 130. It should be noted that in this embodiment of the present disclosure, the first file and the second file are merely used to distinguish files accessed in different access procedures, and do not constitute any limitation to a specific file. In this manner, the first file and the second file may be a same file or may be different files.

In step 805, the CPU 105 obtains an access location according to the file identifier. The access location is used to indicate a start address of data that is to be read from the object file according to the read request. The access location may be a logical access location. In this step, a description of how the CPU 105 obtains the access location according to the file identifier carried in the read request 700 is similar to that of step 305. For details, refer to the description of step 305.

In step 810, the CPU 105 determines, according to the access location, the size of the to-be-read data, and a size of a cache page, M object cache pages and location information of to-be-read data in an object cache page $OCP_j$ of the M object cache pages. A value of j ranges from 1 to M, and M is an integer not less than 1. As described above, a size of one page is usually 4 k bytes (Byte). In this step, a manner of determining, by the CPU 105, the M object cache pages is similar to the manner of determining, by the CPU 105, the N object cache pages in step 310. For details, refer to the description of step 310.

Further, in this step, the CPU 105 may determine the location information of the to-be-read data in the object cache page $OCP_j$ of the M object cache pages according to the access location, the size of the to-be-read data, and the size of the cache page. For ease of description, an example in which the object cache page $OCP_j$ is a file page that is of the second file and that is cached in the DRAM 120, and the size of one cache page is 100 bytes is used. If the access location determined in step 805 is 150 bytes of the second file, and the size of the to-be-read data is 210 bytes, the CPU 105 may determine that the object cache pages are a second cache page p 2 (including a $100^{th}$ to a $199^{th}$ bytes of the second file), a third cache page p 3 (including a $200^{th}$ to a $299^{th}$ bytes of the second file), and a fourth cache page p 4 (including a $300^{th}$ to a $399^{th}$ bytes of the second file) of the second file. In addition, the CPU 105 can determine that the location information of the data to be read according to the read request 700 is $p^2(50, 49)$, $p^3(0, 100)$, and $p^4(0, 61)$. $p^2(50, 49)$ is used to indicate 49 bytes starting from a $50^{th}$ byte in the second cache page, $p^3(0, 100)$ is used to indicate 100 bytes starting from a $0^{th}$ byte in the third cache page, and $p^4(0, 61)$ is used to indicate 61 bytes starting from the $0^{th}$ byte in the fourth cache page. It may be understood that there may be one or more object cache pages that are to be accessed according to read request 700, that is, a value of M may be an integer not less than 1. For ease of description, in this embodiment of the present disclosure, the determined M object cache pages and the location information of the to-be-read data in the object cache page $OCP_j$ may be referred to as information 705 about the to-be-read data. As shown in FIG. 7, after determining the information 705 about the to-be-read data, the CPU 105 may read, according to the determined information 705 about the to-be-read data, data cached in the DRAM 120.

In the embodiment shown in FIG. 8, after obtaining location information of data that is to be read according to the read request 700 from each object cache page $OCP_j$, the CPU 105 may perform the following operations on each object cache page $OCP_j$. It may be understood that in actual application, when determining, in step 810, that there is only one object cache page, the CPU 105 may perform the following operations only on the determined object cache page. When determining, in step 810, that there are multiple object cache pages, that is, when determining, according to the read request 700, that the to-be-read data needs to be separately read from multiple object cache pages, the CPU 105 may perform the following operations on each object cache page. For clarity of description, a description is given below by using an operation method for one object cache page as an example.

In step 815, the CPU 105 determines whether the PCM 125 stores a log chain of the object cache page $OCP_j$. The log chain of the object cache page $OCP_j$ is used to record information about at least one log data chunk of the object cache page $OCP_j$. In this embodiment of the present disclosure, the log chain of the object cache page includes at least one data node. Each data node includes information about one log data chunk. Each log data chunk is modified data of the object cache page during a modification. When the PCM 125 does not store the log chain of the object cache page $OCP_j$, the method goes to step 820. When the PCM 125 stores the log chain of the object cache page $OCP_j$, the method goes to step 825. In actual application, after determining, in step 810, the M object cache pages that are to be accessed according to the read request 700, the CPU 105 may obtain cache page structures of the M object cache pages from metadata information of the object file, and further may determine, according to information recorded in the cache page structures, whether the PCM 125 stores a log chain structure of the object cache page $OCP_j$ of the M object cache pages. For the cache page structures and the log chain structure, refer to FIG. 5. A description of the cache page structures and a manner of determining, according to a cache page structure of the object cache page $OCP_j$, whether the PCM 125 stores the log chain of the object cache page $OCP_j$ are similar to those of step 320 in FIG. 3. For details, refer to the description of step 320.

In step 820, the CPU 105 reads data of the object cache page $OCP_j$ from the DRAM according to the location information of the to-be-read data in the object cache page $OCP_j$. As described in step 320, for any object cache page, the CPU 105 can determine, according to a "log head" or a "log tail" in a cache page structure of the object cache page, whether the PCM 125 stores a log chain of the object cache page. When the CPU 105 determines, in step 815 according to the cache page structure of the object cache page $OCP_j$, that the PCM 125 does not store the log chain of the object cache page $OCP_j$, it indicates that the data of the object cache page $OCP_j$ has not been modified. Therefore, the CPU 105 may directly read the data of the object cache page $OCP_j$ from the DRAM according to a location of the to-be-read data. As shown in FIG. 7, the CPU 105 may obtain read data 720 from a cache page in the DRAM 120.

In step 825, the CPU 105 updates at least one log data chunk to the object cache page according to information about the at least one log data chunk, to obtain an updated object cache page $OCP_j'$, where the information about the at least one log data chunk is recorded in the log chain of the object cache page $OCP_j$. When the CPU 105 determines, in step 815 according to the cache page structure of the object cache page $OCP_j$, that the PCM 125 stores the log chain of the object cache page $OCP_j$, it indicates that the data of the object cache page $OCP_j$ has been modified. Therefore, the CPU 105 needs to update data stored in the log chain in the PCM 125 to the object cache page in the DRAM. In an embodiment, a log data chunk 215 in the log chain of the object cache page $OCP_j$ may be merged into the object cache page, to obtain the updated object cache page $OCP_j'$. In this embodiment of the present disclosure, the log chain of the object cache page $OCP_j$ records the latest modified data of the cache page. Therefore, in a data merging process, the CPU 105 may update the at least one log data chunk to the object cache page according to the information about the at least one log data chunk, where the information about the at least one log data chunk is recorded in the log chain of the object cache page $OCP_j$. In an embodiment, the CPU 105 can separately merge log data chunks into the object cache page $OCP_j$ according to intra-page location information of the log data chunks recorded in data nodes in the log chain of the object cache page $OCP_j$, to obtain the updated object cache page $OCP_j'$. For clarity of description, an example in which a first cache page shown in FIG. 4 is the object cache page $OCP_j$ to be read according to the read request 700 is used. As shown in FIG. 4, a log chain of the first cache page includes a first data node 41051 and a second data node 41052. If an intra-page location of a log data chunk recorded in the first data node 41051 is a $30^{th}$ to a $50^{th}$ bytes, and an intra-page location of a log data chunk recorded in the second data node 41052 is an $80^{th}$ to a $90^{th}$ bytes, the CPU 105 may replace the $30^{th}$ to the $50^{th}$ bytes in the first cache page with the log data chunk recorded in the first data node 41051. In addition, the CPU 105 may replace the $80^{th}$ to the $90^{th}$ bytes in the first cache page with the log data chunk recorded in the second data node 41052, to obtain an updated first cache page.

In step 830, the CPU 105 reads data from the updated object cache page $OCP_j'$ according to the location information of the to-be-read data in the object cache page $OCP_j$. It may be understood that the location information of the to-be-read data is a logical location of the to-be-read data in the object cache page. After the CPU 105 updates, in step 825, the object cache page $OCP_j$ according to the data in the log chain of the object cache page $OCP_j$ stored in the PCM 125, to obtain the updated object cache page $OCP_j'$, the CPU 105 can read data from the updated object cache page $OCP_j'$ according to the location information that is of the to-be-read data in the object cache page $OCP_j$ and that is determined in step 810. For example, if it is determined, in step 810, that the location information of the to-be-read data in the first cache page is a $15^{th}$ to a $50^{th}$ bytes, in this step, the CPU 105 may read data of the $15^{th}$ to the $50^{th}$ bytes from the updated first cache page. As shown in FIG. 7, the CPU 105 may obtain the read data 720 from an object cache page in the updated the DRAM 120.

A person skilled in the art may know that in actual application, when the DRAM 120 does not have to-be-read data, an operating system first loads the to-be-read data from the disk to the DRAM 120, and then reads the data from the cache page of the DRAM.

As may be learned from the data reading process shown in FIG. 8, according to the access request processing method provided in this embodiment of the present disclosure, to-be-modified data of the cache page is stored in the PCM 125 in a log chain manner. Therefore, modification to data whose granularity is less than a page may be supported. When data in the cache page needs to be read, cache page data that is the latest during data reading may be obtained according to a log data chunk in the data node in the log chain. In this embodiment of the present disclosure, the log chain of the object cache page records information about the latest modified data of the cache page. In this manner, intra-page locations of the modified data in the log chain of the object cache page do not overlap each other. Therefore, in the data reading process, the CPU 105 does not need to identify valid data of the object cache page according to information of the data node recorded in the log chain. Instead, the CPU 105 may directly update the log data chunk to the object cache page according to the information about the log data chunk recorded in the log chain of the object cache page. Therefore, a data reading speed can be improved.

Figure 9:
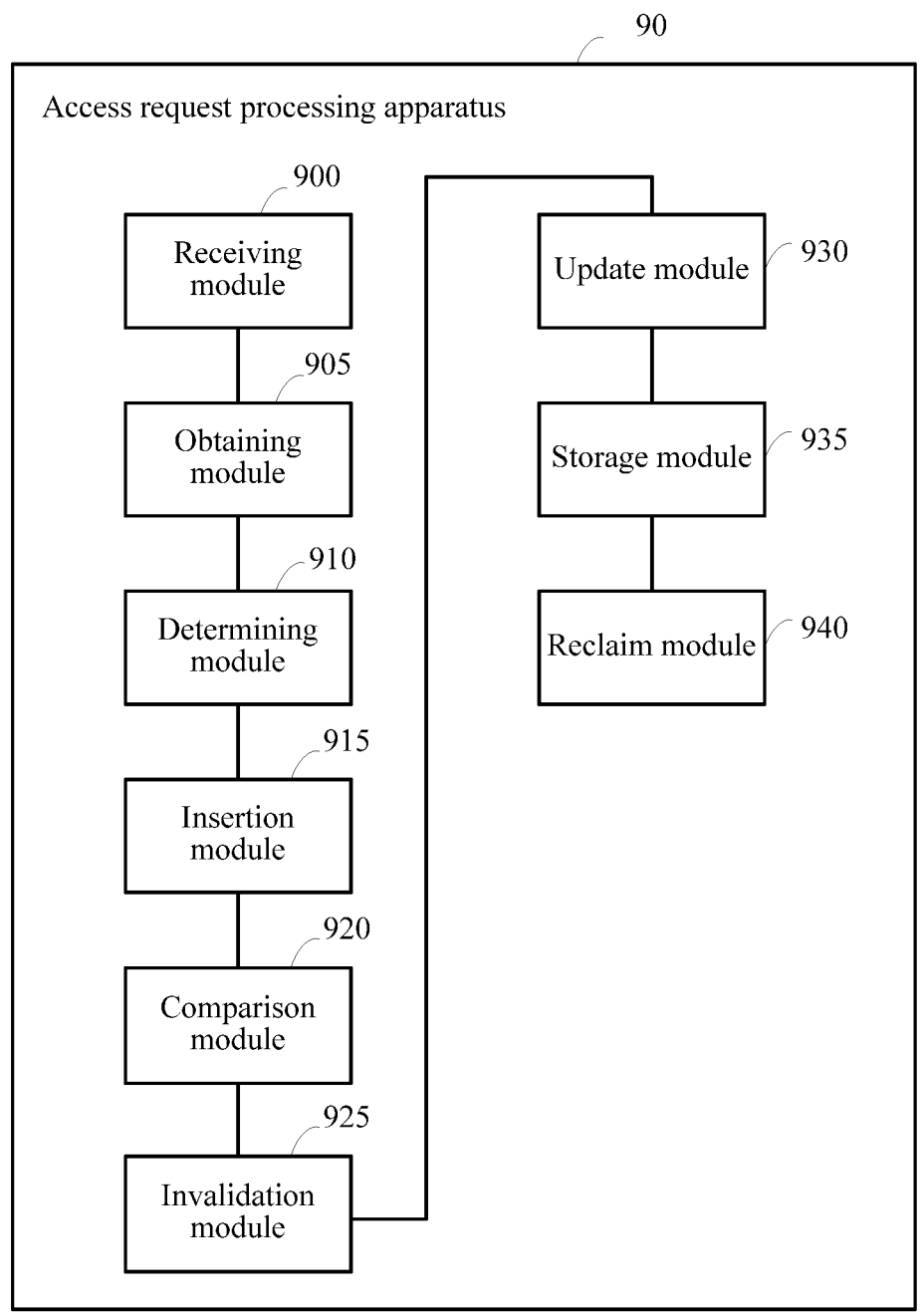
FIG. 9 is a schematic structural diagram of an access request processing apparatus according to an embodiment of the present disclosure.

FIG. 9 is a schematic structural diagram of an access request processing apparatus according to an embodiment of the present disclosure. The apparatus may be applied to a computer system including a non-volatile memory NVM, for example, the apparatus may be applied to the computer system shown in FIG. 1. As shown in FIG. 9, the access request processing apparatus 90 may include the following modules a receiving module 900, configured to receive a write request, where the write request carries a file identifier, a buffer pointer, and a size of to-be-written data, the buffer pointer is used to point to a buffer for caching the to-be-written data, and the to-be-written data is modified data of an object file that is to be accessed according to the write request, an obtaining module 905, configured to obtain an access location according to the file identifier, where the access location is used to indicate a start address for writing data into the object file according to the write request, a determining module 910, configured to determine object cache pages according to the access location, the size of the to-be-written data, and a size of a cache page, where the object cache pages are memory pages in internal memory that are used to cache file data that is in the object file and that is modified by the to-be-written data, where the determining module 910 is further configured to determine that the NVM stores a log chain of a first object cache page of the object cache pages, the log chain of the first object cache page includes a first data node, the first data node includes information about a first log data chunk, and the first log data chunk includes modified data of the first object cache page during a modification, an insertion module 915, configured to insert a second data node into the log chain of the first object cache page, where the second data node includes information about a second log data chunk of the first object cache page, the second log data chunk includes modified data of the first object cache page during a current modification, the second log data chunk is at least partial to-be-written data that is obtained from the buffer to which the buffer pointer points, and the information about the second log data chunk includes the second log data chunk or a storage address of the second log data chunk in the NVM, a comparison module 920, configured to determine that an intra-page location of the second log data chunk overlaps an intra-page location of the first log data chunk, where the intra-page location of the second log data chunk is a location of the second log data chunk in the first object cache page, and the intra-page location of the first log data chunk is a location of the first log data chunk in the first object cache page, and an invalidation module 925, configured to set, in the first data node, data that is in the first log data chunk and that overlaps the second log data chunk to invalid data.

In this embodiment of the present disclosure, the information about the second log data chunk further includes an offset of the second log data chunk in the object cache page, a length of the second log data chunk, and address information of an adjacent data node of the second data node.

In actual application, when performing an operation of inserting a new data node into the log chain of the first object cache page, the insertion module 915 may insert the new data node into a head or a tail of the log chain of the first object cache page. After the new data node is inserted, the log chain of the first object cache page includes at least two data nodes that are sequentially linked according to an update sequence of the first object cache page.

In a case, when the intra-page location of the second log data chunk partially overlaps the intra-page location of the first log data chunk, the invalidation module 925 is configured to modify, in the first data node, information about the intra-page location of the first log data chunk according to an intra-page location of the data that is in the first log data chunk and that overlaps the second log data chunk, to set the data that is in the first log data chunk and that overlaps the second log data chunk to invalid data. The information about the intra-page location of the first log data chunk includes at least one of an "intra-page offset" or a "log data length" of the first log data chunk.

In another case, the invalidation module 925 is configured to, when the intra-page location of the second log data chunk includes the intra-page location of the first log data chunk, delete the first data node.

In still another case, when the intra-page location of the first log data chunk includes the intra-page location of the second log data chunk, the invalidation module 925 is configured to split the first data node into a first data subnode and a second data subnode, and separately record, in the first data subnode and the second data subnode, data that is in the first log data chunk and that does not overlap the second log data chunk, to set the data that is in the first log data chunk and that overlaps the second log data chunk to invalid data. Data structures of the first data subnode and the second data subnode are the same as a data structure of the first data node.

Further, the access request processing apparatus 90 may further includes an update module 930, a storage module 935, and a reclaim module 940. The update module 930 is configured to update at least one log data chunk in the log chain to the first object cache page according to information about the at least one log data chunk, to obtain an updated first object cache page, where the information about the at least one log data chunk is recorded in the log chain of the first object cache page. The storage module 935 is configured to store data of the updated first object cache page in an external storage device of the computer system. The reclaim module 940 is configured to, after the data of the updated first object cache page is stored in the external storage device (for example, the disk 130 shown in FIG. 1) of the computer system, reclaim the log chain of the first object cache page.

For the access request processing apparatus 90 provided in this embodiment of the present disclosure, refer to the access request processing method described in the foregoing embodiments. For detailed descriptions of various modules, separately refer to the descriptions of FIG. 2 to FIG. 6 in the foregoing embodiments. Details are not described herein again.

An embodiment of the present disclosure further provides a computer program product for implementing the access request processing method, including a computer readable storage medium storing program code. An instruction included in the program code is used to perform the method procedure described in any one of the foregoing method embodiments. A person of ordinary skill in the art may understand that the foregoing storage medium includes various non-transitory machine-readable media capable of storing program code, such as a USB flash drive, a removable hard disk, a magnetic disk, an optical disc, a random-access memory (RAM), a solid state disk (SSD), and other non-volatile memories.

It should be noted that the embodiments provided in this application are merely examples. A person skilled in the art may clearly know that, for convenience and conciseness of description, in the foregoing embodiments, the embodiments emphasize different aspects, and for a part not described in detail in one embodiment, reference may be made to relevant description of another embodiment. The embodiments of the present disclosure, claims, and features disclosed in the accompanying drawings may exist independently, or exist in a combination. Features described in a hardware form in the embodiments of the present disclosure may be executed by software, and vice versa. This is not limited herein.

What is claimed is:

1. An access request processing method performed by a computer system comprising a non-volatile memory (NVM), wherein the access request processing method comprises:
   receiving a write request for writing to-be-written data;
   determining an object cache page corresponding to the to-be-written data, wherein the object cache page is a memory page for caching file data of an object file in an internal memory of the computer system, wherein the to-be-written data is for modifying the file data in the object cache page;
   determining that the NVM stores a log chain of the object cache page, wherein the log chain comprises a first data node, wherein the first data node comprises information about a first log data chunk of the object cache page, and wherein the first log data chunk comprises modified data of the object cache page during a modification of the object file;
   inserting a second data node into the log chain, wherein the second data node comprises information about a second log data chunk of the object cache page, wherein the second log data chunk comprises at least part of the to-be-written data, and wherein the information about the second log data chunk comprises the second log data chunk or a storage address of the second log data chunk in the NVM;

determining that an intra-page location of the second log data chunk overlaps an intra-page location of the first log data chunk, wherein the intra-page location of the second log data chunk is a location of the second log data chunk in the object cache page, and wherein the intra-page location of the first log data chunk is a location of the first log data chunk in the object cache page; and setting, in the first data node, data that is in the first log data chunk and that overlaps the second log data chunk to invalid data.

2. The access request processing method of claim 1, wherein the inserting the second data node into the log chain comprises inserting the second data node into a head or a tail of the log chain, and wherein the log chain comprises at least two data nodes that are sequentially linked according to an update sequence of the object cache page after the second data node is inserted.

3. The access request processing method of claim 1, further comprising:

updating at least one log data chunk in the log chain according to information about the at least one log data chunk to obtain an updated object cache page, wherein the information about the at least one log data chunk is recorded in the log chain; and storing data of the updated object cache page in an external storage device of the computer system.

4. The access request processing method of claim 3, further comprising reclaiming the log chain after storing the data of the updated object cache page in the external storage device of the computer system.

5. The access request processing method of claim 1, wherein the setting, in the first data node, the data that is in the first log data chunk and that overlaps the second log data chunk to the invalid data comprises modifying, in the first data node, information about the intra-page location of the first log data chunk according to an intra-page location of the data that is in the first log data chunk and that overlaps the second log data chunk to set the data that is in the first log data chunk and that overlaps the second log data chunk to the invalid data when the intra-page location of the second log data chunk partially overlaps the intra-page location of the first log data chunk, and wherein the information about the intra-page location of the first log data chunk comprises at least one of an "intra-page offset" and a "log data length" of the first log data chunk.

6. The access request processing method of claim 1, wherein the setting, in the first data node, the data that is in the first log data chunk and that overlaps the second log data chunk to the invalid data comprises deleting the first data node when the intra-page location of the second log data chunk comprises the intra-page location of the first log data chunk.

7. The access request processing method of claim 1, wherein the setting, in the first data node, the data that is in the first log data chunk and that overlaps the second log data chunk to invalid data comprises:

splitting the first data node into a first data subnode and a second data subnode when the intra-page location of the first log data chunk comprises the intra-page location of the second log data chunk, and wherein data structures of the first data subnode and the second data subnode are the same as a data structure of the first data node; and separately recording, in the first data subnode and the second data subnode, data that is in the first log data chunk and that does not overlap the second log data chunk to set the data that is in the first log data chunk and that overlaps the second log data chunk to invalid data.

8. A computer system comprising:

a memory comprising a non-volatile memory (NVM), wherein the memory is configured to store instructions; and a processor coupled to the memory and configured to execute the instructions, which cause the processor to be configured to:

receive a write request for writing to-be-written data;

determine an object cache page corresponding to the to-be-written data, wherein the object cache page is a memory page for caching file data of an object file in an internal memory of the computer system, wherein the to-be-written data is used to modify the file data in the object cache page;

determine that the NVM stores a log chain of the object cache page, wherein the log chain comprises a first data node, wherein the first data node comprises information about a first log data chunk of the object cache page, and wherein the first log data chunk comprises modified data of the object cache page during a modification of the object file;

insert a second data node into the log chain, wherein the second data node comprises information about a second log data chunk of the object cache page, wherein the second log data chunk comprises at least part of the to-be-written data, and wherein the information about the second log data chunk comprises the second log data chunk or a storage address of the second log data chunk in the NVM;

determine that an intra-page location of the second log data chunk overlaps an intra-page location of the first log data chunk, wherein the intra-page location of the second log data chunk is a location of the second log data chunk in the object cache page, and wherein the intra-page location of the first log data chunk is a location of the first log data chunk in the object cache page; and set, in the first data node, data that is in the first log data chunk and that overlaps the second log data chunk to invalid data.

9. The computer system of claim 8, wherein the instructions further cause the processor to be configured to insert the second data node into a head or a tail of the log chain, and wherein the log chain comprises at least two data nodes that are sequentially linked according to an update sequence of the object cache page after the second data node is inserted.

10. The computer system of claim 8, wherein the instructions further cause the processor to be configured to:

update at least one log data chunk in the log chain according to information about the at least one log data chunk to obtain an updated object cache page, wherein the information about the at least one log data chunk is recorded in the log chain; and store data of the updated object cache page in an external storage device of the computer system.

11. The computer system of claim 8, wherein the instructions further cause the processor to be configured to modify, in the first data node, information about the intra-page location of the first log data chunk according to an intra-page location of the data that is in the first log data chunk and that overlaps the second log data chunk to set the data that is in the first log data chunk and that overlaps the second log data chunk to the invalid data when the intra-page location of the second log data chunk partially overlaps the intra-page location of the first log data chunk, and wherein the information about the intra-page location of the first log data chunk comprises at least one of an "intra-page offset" and a "log data length" of the first log data chunk.

12. The computer system of claim 8, wherein the instructions further cause the processor to be to delete the first data node when the intra-page location of the second log data chunk comprises the intra-page location of the first log data chunk.

13. The computer system of claim 8, wherein the instructions further cause the processor to be configured to:
split the first data node into a first data subnode and a second data subnode when the intra-page location of the first log data chunk comprises the intra-page location of the second log data chunk, wherein data structures of the first data subnode and the second data subnode are the same as a data structure of the first data node; and
separately record, in the first data subnode and the second data subnode, data that is in the first log data chunk and that does not overlap the second log data chunk to set the data that is in the first log data chunk and that overlaps the second log data chunk to invalid data.

14. The computer system of claim 10, wherein the instructions further cause the processor to be configured to reclaim the log chain after storing the data of the updated object cache page in the external storage device of the computer system.

15. A computer program product comprising computer-executable instructions stored on a non-transitory computer-readable medium that, when executed by a processor, cause an apparatus to:
receive a write request for writing to-be-written data;
determine an object cache page corresponding to the to-be-written data, wherein the object cache page is a memory page for caching file data of an object file in an internal memory of the apparatus, wherein the to-be-written data is used to modify the file data in the object cache page;
determine that a non-volatile memory (NVM) stores a log chain, wherein the log chain comprises a first data node, wherein the first data node comprises information about a first log data chunk of the object cache page, and wherein the first log data chunk comprises modified data of the object cache page during a modification of the object file;
insert a second data node into the log chain, wherein the second data node comprises information about a second log data chunk of the object cache page, wherein the second log data chunk comprises at least part of the to-be-written data, and the information about the second log data chunk comprises the second log data chunk or a storage address of the second log data chunk in the NVM;
determine that an intra-page location of the second log data chunk overlaps an intra-page location of the first log data chunk, wherein the intra-page location of the second log data chunk is a location of the second log data chunk in the object cache page, and wherein the intra-page location of the first log data chunk is a location of the first log data chunk in the object cache page; and
set, in the first data node, data that is in the first log data chunk and that overlaps the second log data chunk to invalid data.

16. The computer program product of claim 15, wherein the computer-executable instructions further cause the apparatus to insert the second data node into a head or a tail of the log chain, and wherein the log chain comprises at least two data nodes that are sequentially linked according to an update sequence of the object cache page, after the second data node is inserted.

17. The computer program product of claim 15, wherein the computer-executable instructions further cause the apparatus to:
update at least one log data chunk in the log chain according to information about the at least one log data chunk to obtain an updated object cache page, wherein the information about the at least one log data chunk is recorded in the log chain; and
store data of the updated object cache page in an external storage device of the apparatus.

18. The computer program product of claim 15, wherein the computer-executable instructions further cause the apparatus to modify, in the first data node, information about the intra-page location of the first log data chunk according to an intra-page location of the data that is in the first log data chunk and that overlaps the second log data chunk to set the data that is in the first log data chunk and that overlaps the second log data chunk to the invalid data when the intra-page location of the second log data chunk partially overlaps the intra-page location of the first log data chunk, and wherein the information about the intra-page location of the first log data chunk comprises at least one of an "intra-page offset" and a "log data length" of the first log data chunk.

19. The computer program product of claim 15, wherein the computer-executable instructions further cause the apparatus to delete the first data node when the intra-page location of the second log data chunk comprises the intra-page location of the first log data chunk.

20. The computer program product of claim 17, wherein the computer-executable instructions further cause the apparatus to reclaim the log chain after storing data of the updated object cache page in the external storage device of the apparatus.

* * * * *